(12) United States Patent
Mihara

(10) Patent No.: US 6,809,879 B2
(45) Date of Patent: Oct. 26, 2004

(54) ZOOM LENS, AND ELECTRONIC IMAGING SYSTEM USING THE SAME

(75) Inventor: Shinichi Mihara, Tama (JP)

(73) Assignee: Olympus Corporation, Shibuya-ku (JP)

(*) Notice: Subject to any disclaimer, the term of this patent is extended or adjusted under 35 U.S.C. 154(b) by 134 days.

(21) Appl. No.: 10/294,774

(22) Filed: Nov. 15, 2002

(65) Prior Publication Data

US 2003/0165018 A1 Sep. 4, 2003

(30) Foreign Application Priority Data

Nov. 16, 2001 (JP) ........................................ 2001-351624

(51) Int. Cl.[7] .............................................. G02B 15/14
(52) U.S. Cl. ........................ 359/682; 359/680; 359/681
(58) Field of Search ................................ 359/680, 681, 359/682, 689

(56) References Cited

U.S. PATENT DOCUMENTS

| | | | |
|---|---|---|---|
| 6,308,011 B1 | 10/2001 | Wachi et al. | 396/72 |
| 6,417,973 B2 * | 7/2002 | Mihara et al. | 359/684 |
| 2003/0169509 A1 * | 9/2003 | Iyama | 359/680 |

FOREIGN PATENT DOCUMENTS

| | | |
|---|---|---|
| EP | 1 093 000 | 4/2001 |
| JP | 2000-267009 | 9/2000 |
| JP | 2000-275520 | 10/2000 |

* cited by examiner

*Primary Examiner*—Georgia Epps
*Assistant Examiner*—M. Hasan
(74) *Attorney, Agent, or Firm*—Kenyon & Kenyon

(57) ABSTRACT

The invention provides a zoom lens that comprises a reduced number of lens elements, is compact and simplified, and has high image-formation capability, thereby achieving thorough size reductions in video cameras or digital cameras, and an electronic imaging system using the same. The zoom lens comprises a first lens group G1 of negative refracting power, a second lens group G2 of positive refracting power and a third lens group G3 of positive refracting power. Upon zooming from the wide-angle end to the telephoto end of the zoom lens, the second lens group G2 moves toward the object side alone of the zoom lens, and the third lens group G3 moves while the spacing between the third lens group G3 and the second lens group G2 varies. The second lens group G2 is composed of a front subgroup and a rear subgroup. The front subgroup is composed of a doublet component consisting of, in order from its object side, a positive lens element having an aspheric surface and a negative lens element, and the rear subgroup is composed of one positive lens component. The third lens group G3 then satisfies condition (1) with respect to the axial radii of curvature of the surfaces located nearest to the object and image sides of the third lens group G3.

23 Claims, 21 Drawing Sheets

C : Cyan    M : Magenta
Ye : Yellow    G : Green ced to this end.
ZOOM LENS, AND ELECTRONIC IMAGING SYSTEM USING THE SAME This application claims benefits of Japanese Application No. 2001-351624 filed in Japan on Nov. 16, 2001, the contents of which are incorporated by this reference.

BACKGROUND OF THE INVENTION

The present invention relates generally to a zoom lens and an electronic imaging system, and more particularly to a zoom lens, the depth dimension of which is diminished by providing some contrivances to an optical system portion such as a zoom lens and an electronic imaging system using the same, such as a video or digital camera. According to the present invention, the zoom lens is also designed to be capable of rear focusing.

In recent years, digital cameras (electronic cameras) have received attention as cameras of the next generation, an alternative to silver-halide 35 mm-film (usually called Leica format) cameras. Currently available digital cameras are broken down into some categories in a wide range from the high-end type for commercial use to the portable low-end type.

In view of the category of the portable low-end type in particular, the primary object of the present invention is to provide the technology for implementing video or digital cameras whose depth dimension is reduced while high image quality is ensured. The gravest bottleneck in diminishing the depth dimension of cameras is the thickness of an optical system, especially a zoom lens system from the surface located nearest to its object side to an image pickup plane. To make use of a collapsible lens mount that allows the optical system to be taken out of a camera body for phototaking and received therein for carrying now becomes mainstream.

However, the thickness of an optical system received in a collapsible lens mount varies largely with the lens type or filters used. Especially in the case of a so-called+precedent type zoom lens wherein a lens group having positive refracting power is positioned nearest to its object side, the thickness of each lens element and dead space are too large to set such requirements as zoom ratios and F-numbers at high values; in other words, the optical system does not become thin as expected, even upon received in the lens mount (JP-A 11-258507). A-precedent type zoom lens, especially of two or three-group construction is advantageous in this regard. However, this type zoom lens, too, does not become slim upon received in a collapsible lens mount, even when the lens positioned nearest to the object side is formed of a positive lens (JP-A 11-52246), because the lens groups are each composed of an increased number of lens elements, and the thickness of lens elements is large. Among zoom lenses known so far in the art, those set forth typically in JP-A's 11-287953, 2000-267009 and 2000-275520 are suitable for use with electronic imaging systems with improved image-formation capabilities including zoom ratios, angles of view and F-numbers, and may possibly be reduced in thickness upon received in collapsible lens mounts.

To make the first lens group thin, it is preferable to make an entrance pupil position shallow; however, the magnification of the second lens group must be increased to this end. For this reason, some considerable load is applied on the second lens group. Thus, it is not only difficult to make the second lens group itself thin but it is also difficult to make correction for aberrations. In addition, the influence of production errors grows. Thickness and size reductions may be achieved by making the size of an image pickup device small. To ensure the same number of pixels, however, the pixel pitch must be diminished and insufficient sensitivity must be covered by the optical system. The same goes true for the influence of diffraction.

To obtain a camera body whose depth dimension is reduced, a rear focusing mode wherein the rear lens group is moved for focusing is effective in view of the layout of a driving system. It is then required to single out an optical system less susceptible to aberration fluctuations upon rear focusing.

SUMMARY OF THE INVENTION

In view of such problems as referred to above, the primary object of the invention is to thoroughly slim down a video or digital camera by singling out a zoom mode or zoom construction wherein a reduced number of lens elements are used to reduce the size of a zoom lens and simplify the layout thereof and stable yet high image-formation capabilities are kept over an infinite-to-nearby range, and optionally making lens elements thin thereby reducing the total thickness of each lens group and slimming down a zoom lens thoroughly by selection of filters.

According to the present invention, the aforesaid object is achievable by the provision of a zoom lens comprising, in order from an object side thereof, a first lens group having negative refracting power, a second lens group having positive refracting power and a third lens group having positive refracting power, wherein:

for zooming from a wide-angle end to a telephoto end of the zoom lens upon focused on an infinite object point, the second lens group moves toward the object side alone and the third lens group moves with a varying spacing with the second lens group, the second lens group comprises, in order from an object side thereof, a front subgroup and a rear subgroup with a space interposed therebetween, wherein the front subgroup consists of a doublet component consisting of, in order from an object side thereof, a positive lens element having an aspheric surface and a negative lens element, and the rear subgroup consists of one positive lens component, and the zoom lens satisfies condition (1) with respect to the third lens group:

$$-0.6<(R_{3F}+R_{3R})/(R_{3F}-R_{3R})<1.2 \tag{1}$$

where $R_{3F}$ is the axial radius of curvature of the surface of the third lens group located nearest to the object side thereof and $R_{3R}$ is the axial radius of curvature of the surface of the third lens group located nearest to the image side thereof.

The advantages of, and the requirements for, the aforesaid zoom lens arrangement are now explained.

The zoom lens of the present invention comprises, in order from an object side thereof, a first lens group having negative refracting power, a second lens group having positive refracting power and a third lens group having positive refracting power. For zooming from the wide-angle end to the telephoto end of the zoom lens upon focused on an infinite object point, the second lens group moves toward the object side alone and the third lens group moves while the spacing between the second lens group and the third lens group varies. The second lens group comprises, in order from an object side thereof, a front subgroup and a rear subgroup with a space interposed therebetween, wherein the front subgroup consists of a doublet component consisting of, in order from an object side thereof, a positive lens element having an aspheric surface and a negative lens element, and the rear subgroup consists of one positive lens component.

In the present disclosure, the term "doublet or cemented lens" should be understood to comprise a plurality of lens elements wherein a lens element formed of a single medium is thought of as one unit, and the "lens component" should be understood to refer to a lens group with no air separation therein, i.e., a single lens or a cemented lens.

For reductions in the size of a two-group zoom lens of –+ construction commonly used as the zoom lens for long-standing silver-halide film cameras, it is preferable to increase the magnification of the positive rear group (the second lens group) at each focal length. To this end, it is already well known to locate an additional positive lens component as the third lens group on the image side of the second lens group, wherein the spacing between the second lens group and the third lens group is varied for zooming from the wide-angle end to the telephoto end. The third lens group has also the possibility of being used for focusing.

To attain the object of the invention, i.e., to diminish the total thickness of a lens portion upon received in a collapsible mount yet perform focusing at the third lens group, it is important to reduce fluctuations of off-axis aberrations inclusive of astigmatism. To this end, the second lens group should preferably be composed of, in order from its object side, two lens components, i.e., a doublet component consisting a positive lens element having an aspheric surface (the front subgroup in the second lens group) and a positive lens component (the rear subgroup in the second lens group).

For focusing at the third lens group, aberration fluctuations become a problem. However, the incorporation of an aspheric surface in the third lens group in an amount than required is not preferable. This is because, to take advantage of that aspheric surface, astigmatism remaining at the first and second lens groups must be corrected at the third lens group. If, in this state, the third lens group moves for focusing, then aberrations are out of balance. Accordingly, when focusing is performed at the third lens group, astigmatism must be eradiated at the first and second lens group all over the zoom range.

It is thus preferable that the third lens group is constructed of a spherical lens component or a reduced amount of asphericity, an aperture stop is located on the object side of the second lens group, and the second lens group is composed of two lens components, that is, in order from its object side, a front subgroup made up of a doublet component consisting of a positive lens element having an aspheric surface and a negative lens element and a positive lens component (the rear subgroup).

Since the diameter of the front lens in this type can substantially be kept small, it is preferable to make the aperture stop integral with the second lens group (in the examples of the invention given later, the aperture stop is located just before the second lens group in a one-piece form), because not only is mechanical simplification achieved but also there is little or no dead space upon the lens portion received in a collapsible mount with a reduced F-number difference between the wide-angle end and the telephoto end. The positive lens element on the object side of the second lens group should preferably be cemented to the negative lens element because some considerable aberrations occur due to the relative decentration between them.

For focusing in particular, the following condition (1) should preferably be satisfied with respect to the third lens group that is movable.

$$-0.6 < (R_{3F}+R_{3R})/(R_{3F}-R_{3R}) < 1.2 \qquad (1)$$

Here $R_{3F}$ is the axial radius of curvature of the surface of the third lens group located nearest to the object side thereof and $R_{3R}$ is the axial radius of curvature of the surface of the third lens group located nearest to the image side thereof.

As the upper limit of 1.2 to condition (1) is exceeded, fluctuations of astigmatism with rear focusing become too large, and astigmatism with respect to a nearby object point is likely to become worse, although astigmatism at an infinite object point may be well corrected. As the lower limit of –1.6 is not reached, correction of aberrations with respect to an infinite object point becomes difficult, although the fluctuations of astigmatism with rear focusing may be reduced.

Upon zooming from the wide-angle end to the telephoto end, the third lens group should preferably be designed to move in a convex locus toward the image side of the zoom lens, because it is easy to ensure a control margin at the telephoto end where focus position variations are large due especially to quality errors. The third lens group may also be designed to move in a convex locus toward the object side of the zoom lens.

The third lens group may also be composed of one positive lens component. Even so, practical-level correction of aberrations is feasible, making contributions to thickness reductions.

More preferably, $$-0.3 < (R_{3F}+R_{3R})/(R_{3F}-R_{3R}) < 0.9 \qquad (1)'$$

Most preferably, $$0 < (R_{3F}+R_{3R})/(R_{3F}-R_{3R}) < 0.6 \qquad (1)''$$

Next, if the first lens group is composed of only two lens elements, i.e., a negative lens element having an aspheric surface and a positive lens element with satisfaction of the following conditions (2) and (3), it is then possible to make good correction for chromatic aberrations and Seidel off-axis aberrations, contributing to thickness reductions.

$$20 < \nu_{11} - \nu_{12} \qquad (2)$$

$$-10 < (R_{13}+R_{14})/(R_{13}-R_{14}) < -1.5 \qquad (3)$$

Here $\nu_{11}$ is the d-line based Abbe number of the negative lens element in the first lens group, $\nu_{12}$ is the d-line based Abbe number of the positive lens element in the first lens group, and $R_{13}$ and $R_{14}$ are the axial radii of curvature of the object side- and image side-surfaces of the positive lens element in the first lens group, respectively.

Condition (2) defines fluctuations of longitudinal aberration and chromatic aberration of magnification during zooming. As the lower limit of 20 is not reached, the fluctuations of longitudinal aberration and chromatic aberration of magnification are prone to become noticeable. There is no particular upper limit because of the absence of any practically suitable medium; however, a prima facie upper limit to $\nu_{11}-\nu_{12}$ may be 75. A glass material exceeding the upper limit of 75 costs much.

Condition (3) defines the shape factor of the positive lens element in the first lens group. Falling short of the lower limit of –10 is not only unfavorable for correction of astigmatism but also requires an additional spacing between the first lens group and the second lens group so as to prevent mechanical interferences during zooming. Exceeding the upper limit of –1.5 may possibly be unfavorable for correction of distortion.

More preferably, the following conditions (2)' and/or (3)' should be satisfied.

$$22 < v_{11} - v_{12} \quad (2)'$$

$$-9 < (R_{13}+R_{14})/(R_{13}-R_{14}) < -2 \quad (3)'$$

Even more preferably, the following conditions (2)" or (3)" should be satisfied.

$$24 < v_{11} - v_{12} \quad (2)''$$

$$8 < (R_{13}+R_{14})/(R_{13}-R_{14}) < -2.5 \quad (3)''$$

Most preferably, both conditions (2)" and (3)" should be satisfied.

When the first lens group can be composed of only two lens elements as described above, substantial thickness reductions can be achieved by allowing the rear subgroup of the second lens group to be composed of a positive single lens component with satisfaction of the following condition (4).

$$0.7 < t_2/t_1 < 1.3 \quad (4)$$

Here $t_1$ is the axial thickness of the first lens group from the surface located nearest to the object side thereof to the surface located nearest to the image side thereof, and $t_2$ is the axial thickness of the second lens group from the surface located nearest to the object side thereof to the surface located nearest to the image side thereof.

Increasing any spacing between the surfaces in each lens group is effective for correction of off-axis aberrations, especially astigmatism; however, this is not permissible for thickness reductions. The second lens group, on the other hand, is less susceptible to deterioration of off-axis aberrations due to the effect of the aspheric surface even when each spacing between the surfaces therein is reduced. In other words, the smaller the value of condition (4), the better the balance becomes. As the upper limit of 1.3 to that condition is exceeded, off-axis aberrations such as astigmatism cannot fully be corrected with a decreasing thickness of each lens group. As the lower limit of 0.7 is not reached, the second lens group cannot physically be set up, or the first lens group rather becomes thick.

More preferably, $$0.8 < t_2/t_1 < 1.2 \quad (4)''$$

More preferably, $$0.9 < t_2/t_1 < 1.1 \quad (4)'''$$

In general, when the rear subgroup of the second lens group is composed of one positive single lens component with satisfaction of the following conditions (5), (6) and (7), it is possible to obtain a zoom lens that, albeit being slimmed down, can have satisfactory image-formation capability.

$$-1.0 < (R_{2RF}+R_{2RR})/(R_{2RF}-R_{2RR}) < 0.5 \quad (5)$$

$$0.04 < t_{2N}/t_2 < 0.2 \quad (6)$$

$$v_{22} < 26.5 \quad (7)$$

Here $R_{2RF}$ is the axial radius of curvature of the surface located nearest to the object side of the rear subgroup of the second lens group, $R_{2RR}$ is the axial radius of curvature of the surface located nearest to the image side of the rear subgroup of the second lens group, $t_{2N}$ is the axial thickness of the front subgroup of the second group to the object side-cementing surface thereof to the image side plane-surface thereof, $t_2$ is the axial thickness of the second lens group from the surface nearest to the object side thereof to the surface located nearest to the image side thereof, and $v_{22}$ is the d-line based Abbe number of the negative lens element in the front subgroup of the second lens group.

Condition (5) defines the shape factor of the positive single lens component in the rear subgroup of the second lens group. As the lower limit of −1.0 is not reached, correction of coma and astigmatism becomes difficult although the air separation $d_{22}$ in the second lens group is easily made thin. As the upper limit of 0.5 is exceeded, mechanical interferences between the negative lens element in the front subgroup of the second lens group and the positive lens component in the rear subgroup of the second lens possibly cause that air separation $d_{22}$ to become large, offering an obstacle to reducing the thickness of the zoom lens upon received on a collapsible lens mount.

Condition (6) defines the axial distance, $t_{2N}$, from the image side-surface of the positive lens element located on the object side of the doublet component to the image side-surface of the negative lens element in the doublet component in the front subgroup of the second lens group. Unless this part has a certain thickness, astigmatism cannot fully be corrected; however, increasing the thickness of that part offers an obstacle to making each lens element thin. Accordingly, astigmatism should be corrected by the introduction of an aspheric surface to any surface in the first lens group. Nonetheless, falling short of the lower limit of 0.04 renders it impossible to make perfect correction of astigmatism. As the upper limit of 0.2 is exceeded, thickness increases unacceptably.

Condition (7) defines correction of longitudinal chromatic aberration and chromatic aberration of magnification. Exceeding the upper limit of 26.5 to condition (7) results in under-correction of longitudinal chromatic aberration. Although there is no particular lower limit to $v_{22}$ because of the absence of any practically suitable medium, a prima facie lower limit thereto may be 20. A glass material below that lower limit costs much.

More preferably, at least one or all of the following conditions (5)', (6)' and (7)' should be satisfied.

$$-0.9 < (R_{2RF}+R_{2RR})/(R_{2RF}-R_{2RR}) < 0.2 \quad (5)'$$

$$0.06 < t_{2N}/t_2 < 0.18 \quad (6)'$$

$$v_{22} < 26 \quad (7)'$$

Even more preferably, at least one of the following conditions (5)", (6)" and (7)" should be satisfied.

$$-0.8 < (R_{2RF}+R_{2RR})/(R_{2RF}-R_{2RR}) < 0.05 \quad (5)'$$

$$0.08 < t_{2N}/t_2 < 0.16 \quad (6)''$$

$$v_{22} < 25.5 \quad (7)''$$

Most preferably, conditions (5)", (6)" and (7)" should be all satisfied.

According to another arrangement for the second lens group, the rear subgroup may be composed of a doublet component consisting of, in order from its object side, a negative lens element and a positive lens element. In this embodiment, too, thickness reductions are achievable by satisfaction of condition (8) given below.

$$0.8 < t_2/t_1 < 1.5 \quad (8)$$

Here $t_1$ is the axial thickness of the first lens group from the surface located nearest to the object side thereof to the surface located nearest to the image side thereof, and $t_2$ is the axial thickness of the second lens group from the surface located nearest to the object side thereof to the surface located nearest to the image side thereof.

The same requirement for condition (4) holds true for condition (8).

More preferably, $$0.9 < t_2/t_1 < 1.4 \tag{8}'$$

Most preferably, $$1.0 < t_2/t_1 < 1.3 \tag{8}'$$

When the rear subgroup of the second lens group is made up of the doublet component consisting of, in order from its object side, the negative lens element and the positive lens element, it is also preferable to satisfy conditions (9) and (10) given below.

$$-1.5 < (R_{2RF} + R_{2RR})/(R_{2RF} - R_{2RR}) < 0 \tag{9}$$

$$0 < v_{2RN} - v_{22} < 35 \text{ wherein } v_{22} \leq 26.5 \tag{10}$$

Here $R_{2RF}$ is the axial radius of curvature of the surface located nearest to the object side of the rear subgroup of the second lens group, $R_{2RR}$ is the axial radius of curvature of the surface located nearest to the image side of the rear subgroup of the second lens group, $v_{2RN}$ is the d-line based Abbe number of the medium of the negative lens element in the rear subgroup of the second lens group, and $v_{22}$ is the d-line based Abbe number of the medium of the negative lens element in the front subgroup of the second lens group.

The same requirement for condition (5) holds true for condition (9).

Condition (10) is provided to make a well-balanced correction for longitudinal chromatic aberration and chromatic aberration of magnification. As the lower limit of 0 is not reached, the longitudinal chromatic aberration is susceptible to under-correction and the chromatic aberration of magnification to over-correction. As the upper limit of 35 is exceeded, the converse is true.

More preferably, the following conditions (9)' and/or (10)' should be satisfied.

$$-1.4 < (R_{2RF} + R_{2RR})/(R_{2RF} - R_{2RR}) < -0.1 \tag{9}'$$

$$5 < v_{2RN} - v_{22} < 30 \text{ where } v_{22} \leq 26 \tag{10}'$$

Even more preferably, the following conditions (9)" or (10)" should be satisfied.

$$-1.3 < (R_{2RF} + R_{2RR})/(R_{2RF} - R_{2RR}) < -0.2 \tag{9}''$$

$$10 < v_{2RN} - v_{22} < 25 \text{ where } v_{22} \leq 25.5 \tag{10}''$$

Referring here to the aspheric surface introduced in the second lens group, the introduction of the aspheric surface to the front subgroup of the second lens group is effective for correction of spherical aberrations and coma. At the same time, this aspheric surface cooperates with a strong diverging surface in the front subgroup of the second lens group to cancel out aberration coefficients in that front subgroup, so that the relative decentration sensitivity of the front subgroup to the rear subgroup of the second lens group can be reduced. It is noted that correction of remaining coma, astigmatism, etc. by the introduction of an aspheric surface to the rear subgroup of the second lens group is not preferable because the relative decentration sensitivity of the rear subgroup to the front subgroup is rather increased. It is thus preferable that the rear subgroup of the second lens group consists only of spherical surfaces or an aspheric surface having a reduced amount of decentration is used thereat. In other words, the following condition (a) should preferably be satisfied.

$$0 \leq |Asp2R| \leq f_w \times 10^{-3} \text{ (mm)} \tag{a}$$

Here Asp21R is the amount of displacement of the aspheric surface from a spherical surface having a radius of curvature on the optical axis of all refracting surfaces in the rear subgroup of the second lens group, as measured at a position whose height from the optical axis is 0.8 time as small as the radius of the aperture stop at the telephoto end, and $f_w$ is the focal length of the zoom lens at the wide-angle end.

It is understood that the "amount of displacement of the aspheric surface" used herein refers to the amount of displacement of a certain aspheric surface with respect to a (reference) spherical surface having an axial radius of curvature, r, on that optical axis, as shown in FIG. 16, as measured at a position whose height from the optical axis is 0.8 time as small as the radius of the aperture stop at the telephoto end.

More preferably, $$0 \leq |Asp2R| \leq 0.5 f_w \times 10^{-3} \text{ (mm)} \tag{a}'$$

Most preferably, $$0 \leq |Asp2R| \leq 0.2 f_w \times 10^{-3} \text{ (mm)} \tag{a}''$$

The zoom lens of the present invention should preferably satisfies conditions (11), (12), (13) and (14) with respect to the second lens group in general.

$$0.6 < R_{23}/R_{21} < 1.0 \tag{11}$$

$$0.05 < f_{2R}/R_{22} < 1.5 \tag{12}$$

$$0.7 < f_{2R}/f_2 < 2 \tag{13}$$

$$0.01 < n_{22} - n_{21} < 0.20 \tag{14}$$

Here $R_{21}$ is the axial radius of curvature of the surface located nearest to the object side of the front subgroup of the second lens group, $R_{22}$ is the axial radius of curvature of the cementing surface in the front subgroup of the second lens group, $R_{23}$ is the axial radius of curvature of the surface located nearest to the image side of the front subgroup of the second lens group, $f_{2R}$ is the focal length of the rear subgroup of the second lens group, $f_2$ is the composite focal length of the second lens group, and $n_{21}$ and $n_{22}$ are the d-line based refractive indices of the media of the positive and negative lens elements in the front subgroup of the second lens group, respectively.

The doublet component that forms the front subgroup of the second lens group is provided to cancel out aberration coefficients therein to decrease the sensitivity to decentration. Exceeding the upper limit of 1.0 to condition 11 may be favorable for correction of spherical aberrations, coma and astigmatism throughout the zoom lens; however, the effect of cementing on slacking the sensitivity to decentration becomes slender. As the lower limit of 0.6 is not reached, the correction of spherical aberrations, coma and astigmatism throughout the zoom lens tends to become difficult.

Condition (12), too, provides a definition of correction of longitudinal chromatic aberration and chromatic aberration of magnification. As the upper limit of 1.5 to condition (12) is exceeded, it is easy to make the doublet component in the second lens group thin but correction of the longitudinal chromatic aberration becomes difficult. As the lower limit of 0.05 is not reached, favorable correction of the longitudinal chromatic aberration may be made; however, there is no option but to increase the thickness of the doublet component, offering an obstacle to reducing the thickness of the zoom lens portion upon received in a collapsible lens mount.

As the upper limit of 2 to condition (13) is exceeded, an exit pupil position comes close to the image plane, leading to the likelihood of shading and the relative decentration sensitivity between the front subgroup and the rear subgroup of the second lens group increases. As the lower limit of 0.7 is not reached, it is not only difficult to make sufficient correction of spherical aberrations, coma and astigmatism, but it is also difficult to ensure any high zoom ratio while maintaining compactness.

Condition (14) defines a difference in the index of refraction between the positive lens element and the negative lens element in the front subgroup of the second lens group. As the lower limit of 0.01 is not reached, general correction of coma and so on becomes difficult although the relative decentration sensitivity between the front subgroup and the rear subgroup in the second lens group may be decreased. Exceeding the upper limit of 0.20 may be favorable for correction of aberrations all over the zooming range; however, this is unfavorable for improving on the relative decentration sensitivity between the front subgroup and the rear subgroup in the second lens group.

More preferably, at least one or all of the following conditions (11)', (12)', (13)' and (14)' should be satisfied.

$$0.65 < R_{23}/R_{21} < 0.95 \quad (11)'$$

$$0.2 < f_{2R}/R_{22} < 1.4 \quad (12)'$$

$$0.75 < f_{2R}/f_2 < 1.9 \quad (13)'$$

$$0.02 < n_{22} - n_{21} < 0.18 \quad (14)'$$

Even more preferably, at least one of the following conditions (11)", (12)", (13)" and (14)" should be satisfied.

$$0.7 < R_{23}/R_{21} < 0.9 \quad (11)''$$

$$0.5 < f_{2R}/R_{22} < 1.3 \quad (12)''$$

$$0.8 < f_{2R}/f_2 < 1.8 \quad (13)''$$

$$0.03 < n_{22} - n_{21} < 0.16 \quad (14)''$$

Most preferably, these conditions (11)", (12)", (13)" and (14)" should be all satisfied.

The zoom lens of the present invention is favorable for setting up an electronic imaging system including a wide-angle area. In particular, the present zoom lens is preferable for use on an electronic imaging system wherein the diagonal half angle of view, $\omega_w$, at the wide-angle end satisfies the following condition (this diagonal half angle of view is tantamount to the wide-angle-end half angle of view $\omega_w$ referred to in the examples given later):

$$27° < \omega_w < 42°$$

Being less than the lower limit of 27° to this condition or the wide-angle-end half angle of view becoming narrow is advantageous for correction of aberrations; however, this wide-angle-end half angle is no longer practical. As the upper limit of 42° is exceeded, on the other hand, distortion and chromatic aberration of magnification tend to occur and the number of lens elements increases.

With the present zoom lens used with the electronic imaging system of the present invention, off-axis chief rays are so almost vertically guided to the image pickup device that an image clear as far as its perimeter can be obtained. To reconcile an image of good quality with compactness, the diagonal length L of the effective image pickup area of the image pickup device should preferably be 3.0 mm to 12.0 mm inclusive.

Thus, the present invention provides means for improving the image-formation capability of the zoom lens part while diminishing the thickness the zoom lens part upon received in a collapsible lens mount.

Next, how and why the thickness of filters is reduced is now explained. In an electronic image pickup system, an infrared absorption filter having a certain thickness is usually inserted between an image pickup device and the object side of a zoom lens, so that the incidence of infrared light on the image pickup plane is prevented. Here consider the case where this filter is replaced by a coating devoid of thickness. In addition to the fact that the system becomes thin as a matter of course, there are spillover effects. When a near-infrared sharp cut coat having a transmittance ($\tau_{600}$) of at least 80% at 600 nm and a transmittance ($\tau_{700}$) of up to 8% at 700 nm is introduced between the image pickup device in the rear of the zoom lens system and the object side of the system, the transmittance at a near-infrared area of 700 nm or longer is relatively lower and the transmittance on the red side is relatively higher as compared with those of the absorption type, so that the tendency of bluish purple to turn into magenta—a defect of a CCD or other solid-state image pickup device having a complementary colors mosaic filter—is diminished by gain control and there can be obtained color reproduction comparable to that by a CCD or other solid-state image pickup device having a primary colors filter.

Thus, it is preferable to satisfy conditions (15) and (16):

$$\tau_{600}/\tau_{550} \geq 0.8 \quad (15)$$

$$\tau_{700}/\tau_{550} \geq 0.08 \quad (16)$$

Here $\tau_{550}$ is the transmittance at a wavelength of 550 nm.

More preferably, the following conditions (15)' and/or (16)' should be satisfied:

$$\tau_{600}/\tau_{550} \geq 0.85 \quad (15)'$$

$$\tau_{700}/\tau_{550} \geq 0.05 \quad (16)'$$

Even more preferably, the following conditions (15)" or (16)" should be satisfied:

$$\tau_{600}/\tau_{550} \geq 0.9 \quad (15)''$$

$$\tau_{700}/\tau_{550} \geq 0.03 \quad (16)''$$

Most preferably, both conditions (15)" and (16)" should be satisfied.

Another defect of the CCD or other solid-state image pickup device is that the sensitivity to the wavelength of 550 nm in the near ultraviolet area is considerably higher than that of the human eye. This, too, makes noticeable chromatic blurring at the edges of an image due to chromatic aberrations in the near ultraviolet area. Such chromatic blurring is fatal to a compact optical system. Accordingly, if an absorber or reflector is inserted on the optical path, which is designed such that the ratio of the transmittance ($\tau_{400}$) at 400 nm wavelength to that ($\tau_{550}$) at 550 nm wavelength is less than 0.08 and the ratio of the transmittance ($\tau_{440}$) at 440 nm wavelength to that ($\tau_{550}$) at 550 nm wavelength is greater than 0.4, it is then possible to considerably reduce noises such as chromatic blurring while the wavelength area necessary for color reproduction (satisfactory color reproduction) is kept intact.

It is thus preferably to satisfy conditions (17) and (18):

$$\tau_{400}/\tau_{550} \leq 0.08 \tag{17}$$

$$\tau_{440}/\tau_{550} \geq 0.4 \tag{18}$$

More preferably, the following conditions (17)' and/or (18)' should be satisfied.

$$\tau_{400}/\tau_{550} \leq 0.06 \tag{17}'$$

$$\tau_{440}/\tau_{550} \geq 0.5 \tag{18}'$$

Even more preferably, the following condition (17)" or (18)" should be satisfied.

$$\tau_{440}/\tau_{550} \leq 0.04 \tag{17}"$$

$$\tau_{440}/\tau_{550} \geq 0.6 \tag{18}"$$

Most preferably, both condition (17)" and (18)" should be satisfied.

It is noted that these filters should preferably be located between the image-formation optical system and the image pickup device.

On the other hand, a complementary colors filter is higher in substantial sensitivity and more favorable in resolution than a primary colors filter-inserted CCD due to its high transmitted light energy, and provides a great merit when used in combination with a small-size CCD. Regarding an optical low-pass filter that is another filter, too, its total thickness $t_{LPF}$ (mm) should preferably satisfy condition (19):

$$0.15 < t_{LPF}/a < 0.45 \tag{19}$$

Here $a$ is the horizontal pixel pitch (in $\mu$m) of the image pickup device, and 5 $\mu$m or lower.

Reducing the thickness of the optical low-pass filter, too, is effective for making the thickness of the zoom lens upon received in a collapsible mount; however, this is generally not preferred because the moiré preventive effect becomes slender. On the other hand, as the pixel pitch becomes small, the contrast of frequency components greater than Nyquist threshold decreases under the influence of diffraction of an image-formation lens system and, consequently, the decrease in the moiré preventive effect is more or less acceptable. For instance, it is known that when three different filters having crystallographic axes in directions where upon projected onto the image plane, the azimuth angle is horizontal (=0°) and ±45° are used while they are put one upon another, some moiré preventive effect is obtainable. According to the specifications known to make the filter assembly thinnest, each filter is displaced by $a$ $\mu$m in the horizontal and by SQRT(½)*a $\mu$m in the ±45° directions. Here SQRT means a square root. The then filter thickness is approximately given by [1+2*SQRT(½)]*a/5.88 (mm). This is the specification where the contrast is reduced down to zero at a frequency corresponding just to Nyquist threshold. At a thickness a few % to a few tens of % smaller than this, a little more contrast of the frequency corresponding to Nyquist threshold appears; however, this can be suppressed under the influence of the aforesaid diffraction.

In other filter embodiments where two filters are placed one upon another or one single filter is used, too, it is preferable to meet condition (19). When the upper limit of 0.45 is exceeded, the optical low-pass filter becomes too thick, contrary to size reduction requirements. When the lower limit of 0.15 is not reached, moiré removal becomes insufficient. In this condition, $a$ should be 5 $\mu$m or less.

When $a$ is 4 $\mu$m or less or where the optical low-pass filter is more susceptible to diffraction, it is preferable that $$0.13 < t_{LPF}/a < 0.42 \tag{19}'$$

Depending on the number of low-pass filters put on the horizontal pixel pitch, it is also acceptable to meet condition (19)":

$$0.3 < t_{LPF}/a < 0.4 \tag{19}"$$

However, $0.2 < t_{LPF}/a < 0.28$ provided that three filters are placed one upon another and $4 \leq a < 5$ $\mu$m, $0.1 < t_{LPF}/a < 0.16$ provided that two filters are placed one upon another and $4 \leq a < 5$ $\mu$m, $0.25 < t_{LPF}/a < 0.37$ provided that three filters are placed one upon another and $a < 4$ $\mu$m, $0.16 < t_{LPF}/a < 0.25$ provided that two filters are placed one upon another and $a < 4$ $\mu$m, and $0.08 < t_{LPF}/a < 0.14$ provided that one filter is used and $a < 4$ $\mu$m.

When an image pickup device having a small pixel pitch is used, there is degradation in image quality under the influence of diffraction effect by stop-down. In this case, the electronic image pickup system is designed in such a way as to have a plurality of apertures each of fixed aperture size, one of which can be inserted into any one of optical paths between the lens surface located nearest to the image side of the first lens group and the lens surface located nearest to the object side of the third lens group and can be replaced with another as well, so that illuminance on the image plane can be adjusted. Then, media whose transmittances with respect to 550 nm are different but less than 80% are filled in some of the plurality of apertures for light quantity control. Alternatively, when control is carried out in such a way as to provide a light quantity corresponding to such an F-number as given by $a$ ($\mu$m)/F-number<4.0, it is preferable to fill the apertures with medium whose transmittance with respect to 550 nm are different but less than 80%. In the range of the full-aperture value to values deviating from the aforesaid condition as an example, any medium is not used or dummy media having a transmittance of at least 91% with respect to 550 nm are used. In the range of the aforesaid condition, it is preferable to control the quantity of light with an ND filter or the like, rather than to decrease the diameter of the aperture stop to such an extent that the influence of diffraction appears.

Alternatively, it is acceptable to uniformly reduce the diameters of a plurality of apertures inversely with the F-numbers, so that optical low-pass filters having different frequency characteristics can be inserted in place of ND filters. As degradation by diffraction becomes worse with stop-down, it is desirable that the smaller the aperture diameter, the higher the frequency characteristics the optical low-pass filters have.

A zoom lens such as one contemplated herein may be decreased in size with a diminishing size of an image pickup device used therewith.

To slim down a camera, it is effective to use the present zoom lens in combination with an electronic image pickup device that is small enough to satisfy condition (20):

$$F \geq a \tag{20}$$

where a is the horizontal pixel pitch of the electronic image pickup device and F is a full-aperture F-number at the wide-angle end of the zoom lens. In this case, it is more preferable to rely on such contrivances as described below.

As the image pickup device becomes small, the pixel pitch becomes proportionally small, and so deterioration of image quality under the influence of diffraction is not negligible. Especially when the image pickup device is diminished to such a degree that the relation between the full-aperture F-number at the wide-angle end and the horizontal pixel pitch a ($\mu$m) of the electronic image pickup device used meets the aforesaid condition (20), it is usable only in a full-aperture state. It is thus preferable that the aperture stop that determines the F-number has a fixed inner diameter and is kept against the insertion and de-insertion or replacement.

In addition, at least one of refracting surfaces adjacent to the aperture stop is located such that its convex surface (that is herein the refracting surface adjacent to the image side of the zoom lens) is directed toward the aperture stop and the point of intersection of the optical axis with a perpendicular from that aperture stop down to the optical axis is positioned within 0.5 mm from the apex of the convex surface or that convex surface intersects or contacts the inside diameter part of the aperture stop inclusive of the back surface of the aperture stop part. This contributes remarkably to size reductions because some considerable space so far needed for the aperture stop can be dispensed with and so considerable space savings are achievable.

As described above, it is preferable to use variable transmittance means instead of the aperture stop for the purpose of controlling the quantity of light. Because no particular problem arises in association with the location of the variable transmittance means on the optical path, it should preferably be inserted in any available space (e.g., between the second lens group and the third lens group or on the image plane side of the third lens group). For the present invention in particular, the variable transmittance means should preferably be inserted between the zooming lens group and the image pickup device.

For the variable transmittance means, it is acceptable to use means whose transmittance is variable depending on voltage or the like or a plurality of filters with varying transmittances, which are used in combination such that they can be inserted or de-inserted or replaced. Alternatively, a shutter for controlling the quantity of a light beam guided to the electronic image pickup device may be located in a space different from that for the aperture stop.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

DESCRIPTION OF THE PREFERRED EMBODIMENTS

Examples 1 to 8 of the zoom lens used with the electronic imaging system of the present invention are now explained. Sectional lens configurations of these examples at the wide-angle end (a), in an intermediate state (b) and at the telephoto end (c) upon focused on an object point at infinity are shown in FIGS. 1 through 7 wherein G1 represents a first lens group, S a stop, G2 a second lens group, G3 a third lens group, capital IF a an infrared cut absorption filter, capital LF a low-pass filter, CG a cover glass for a CCD that is an electronic image pickup device located on the image side of the zoom lens, and I the image plane of CCD. Instead of the infrared cut absorption filter IF, it is acceptable to use a transparent plane plate with a near-infrared sharp cut coat applied on the entrance surface or a low-pass filter LF that is directly provided with a near-infrared sharp cut coat.

EXAMPLE 1

Figure 1A:
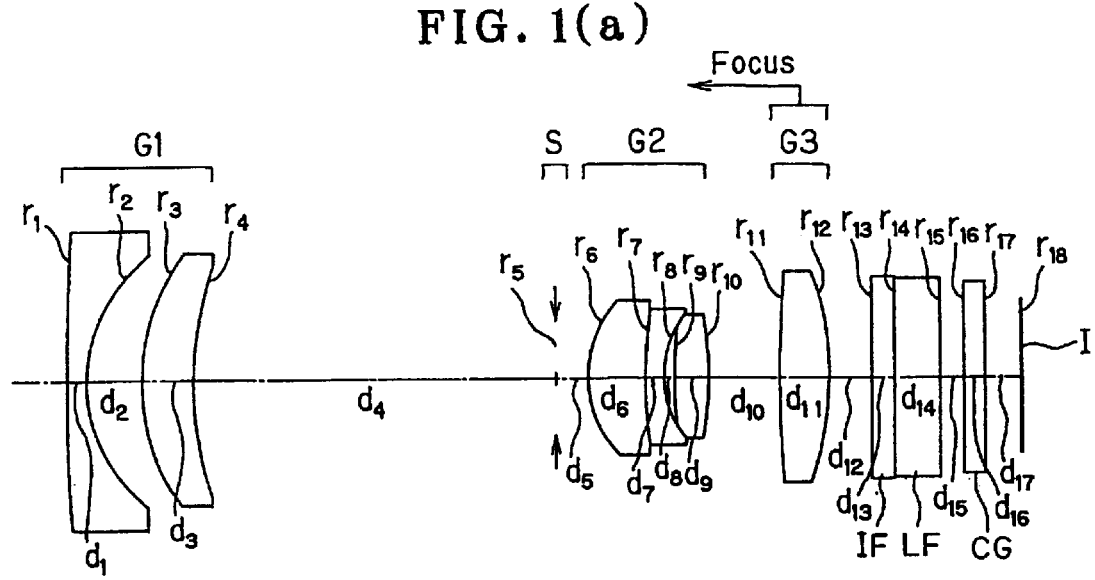
FIGS. 1(*a*), 1(*b*) and 1(*c*) are illustrative in section of Example 1 of the zoom lens used with the electronic imaging system of the present invention at the wide-angle end (a), in an intermediate state (b) and at the telephoto end (c) when the zoom lens is focused on an object point at infinity.
Figure 1B:
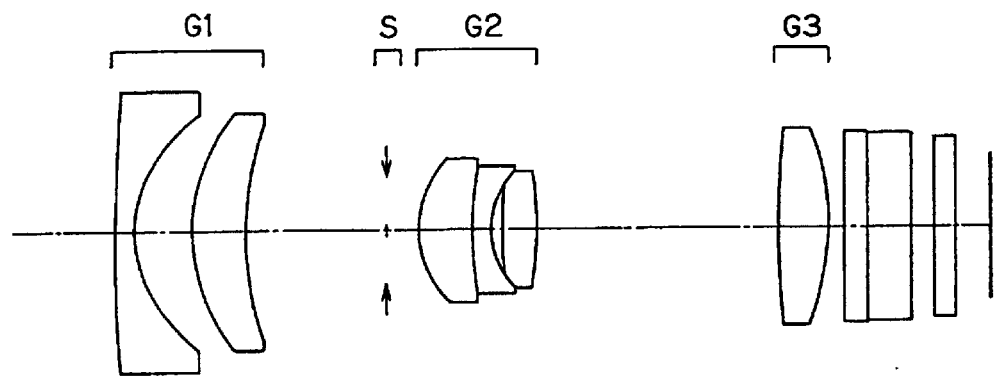
Figure 1C:
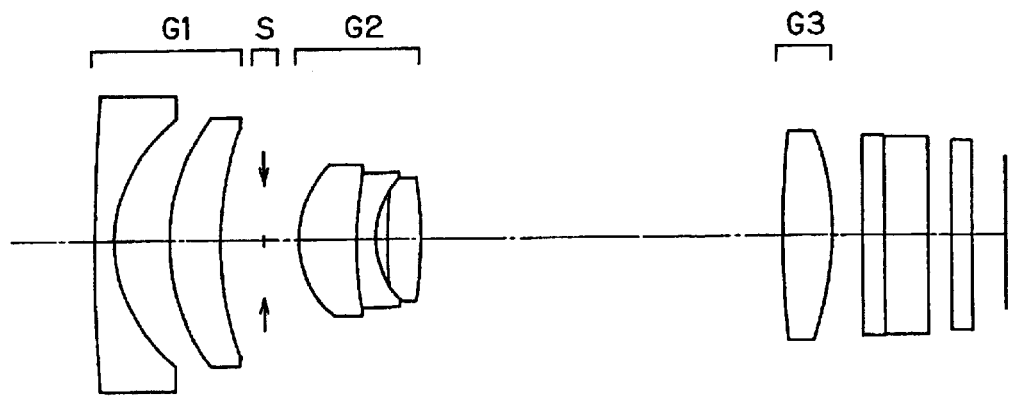

As shown in FIGS. 1(a), 1(b) and 1(c), Example 1 is directed to a zoom lens made up of a first lens group G1 composed of a negative meniscus lens convex on its object side and a positive meniscus lens on convex on its object side and having negative refracting power, an aperture stop S, a second lens group G2 made up of a front subgroup and a rear subgroup wherein the front subgroup is composed of a doublet consisting of a positive meniscus lens convex on its object side and a negative meniscus lens convex on its object side and the rear subgroup consists of one double-convex lens, and a third lens group consisting of one double-convex positive lens and having positive refracting power. Upon zooming from the wide-angle end to the telephoto end of the zoom lens, the first lens group G1 moves in a concave locus toward the object side of the zoom lens and positioned nearer to the image plane side of the zoom lens at the telephoto end than at the wide-angle end, the second lens group G2 moves together with the aperture stop S toward the object side, and the third lens group G3 moves in a convex locus toward the image plane side and positioned nearer to the image plane side at the telephoto end than at the wide-angle end. For focusing on a nearby subject, the third lens group G3 moves toward the object side.

Two aspheric surfaces are used; one at the image side-surface of the negative meniscus lens in the first lens group G1 and another at the object side-surface of the doublet in the front subgroup of the second lens group G2.

EXAMPLE 2

Figure 2A:
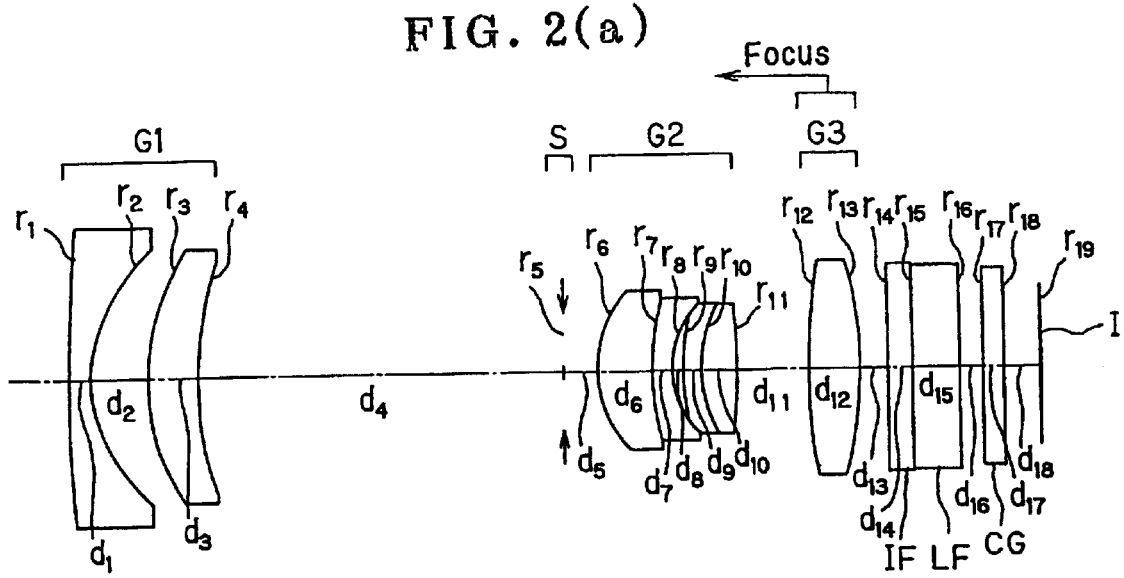
FIGS. 2(*a*), 2(*b*) and 2(*c*) are sectional views of Example 2 of the zoom lens, similar to FIGS. 1(*a*) to 1(*c*).
Figure 2B:
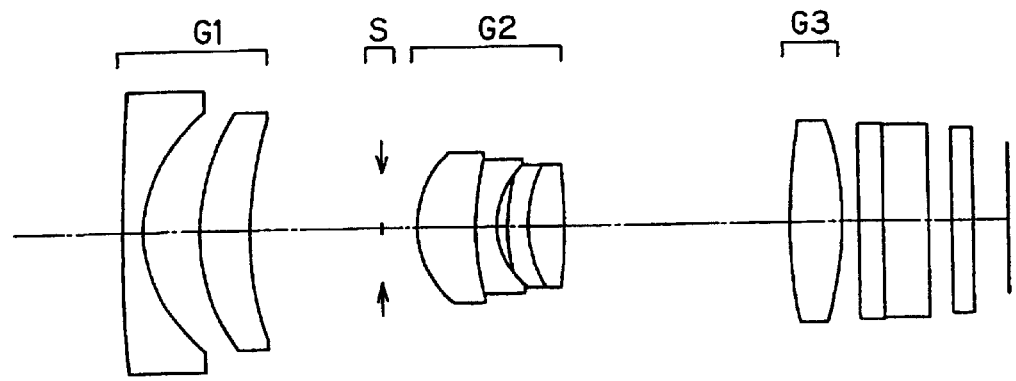
Figure 2C:
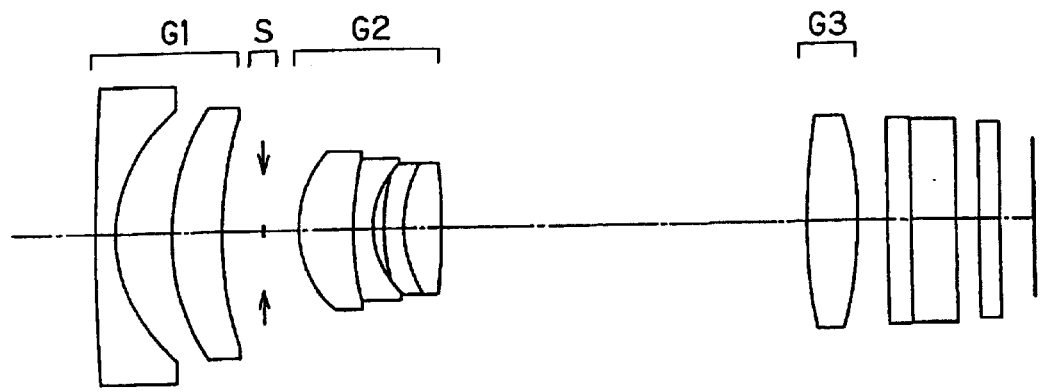

As shown in FIGS. 2(a), 2(b) and 2(c), Example 2 is directed to a zoom lens made up of a first lens group G1 composed of a negative meniscus lens convex on its object side and a positive meniscus lens convex on its object side and having negative refracting power, an aperture stop S, a second lens group G2 made up of a front subgroup and a rear subgroup wherein the front subgroup is composed of a doublet consisting of a positive meniscus lens convex on its object side and a negative meniscus lens convex on its object side and the rear subgroup is composed of a positive doublet consisting of a negative meniscus lens convex on its object side and a double-convex positive lens, and a third lens group G3 composed of one double-convex positive lens and having positive refracting power. Upon zooming from the wide-angle end to the telephoto end of the zoom lens, the first lens group G1 moves in a concave locus toward the object side of the zoom lens and positioned nearer to the image plane side of the zoom lens at the telephoto end than at the wide-angle end, the second lens group G2 moves together with the aperture stop S toward the object side, and the third lens group G3 moves in a convex locus toward the image plane side and positioned nearer to the image plane side at the telephoto end than at the wide-angle end. For focusing on a nearby subject, the third lens group G3 moves toward the object side.

Two aspheric surfaces are used; one at the image plane side-surface of the negative meniscus lens in the first lens group G1 and another at the object side-surface of the doublet in the front subgroup of the second lens group G2.

EXAMPLE 3

Figure 3A:
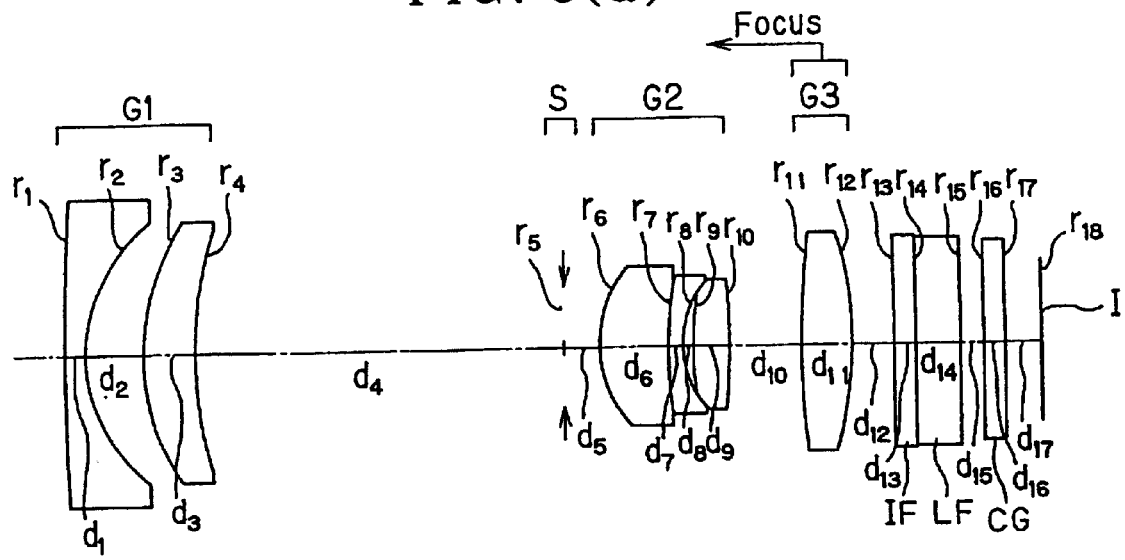
FIGS. 3(*a*), 3(*b*) and 3(*c*) are sectional views of Example 3 of the zoom lens, similar to FIGS. 1(*a*) to 1(*c*).
Figure 3B:
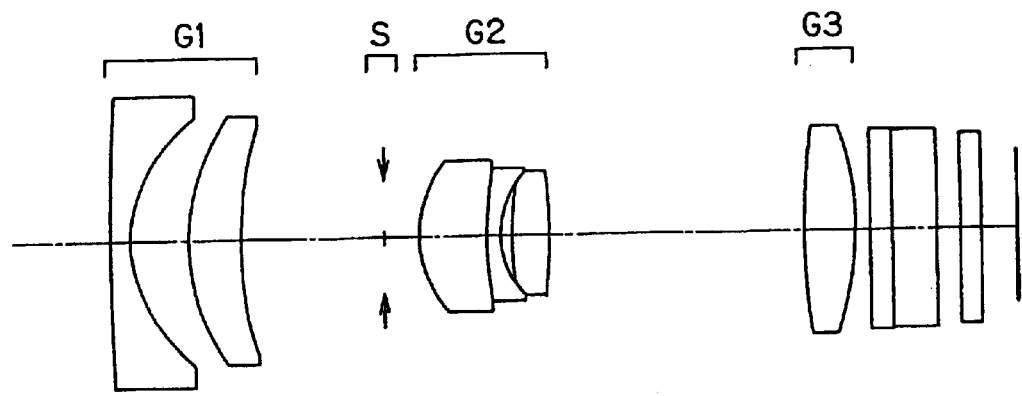
Figure 3C:
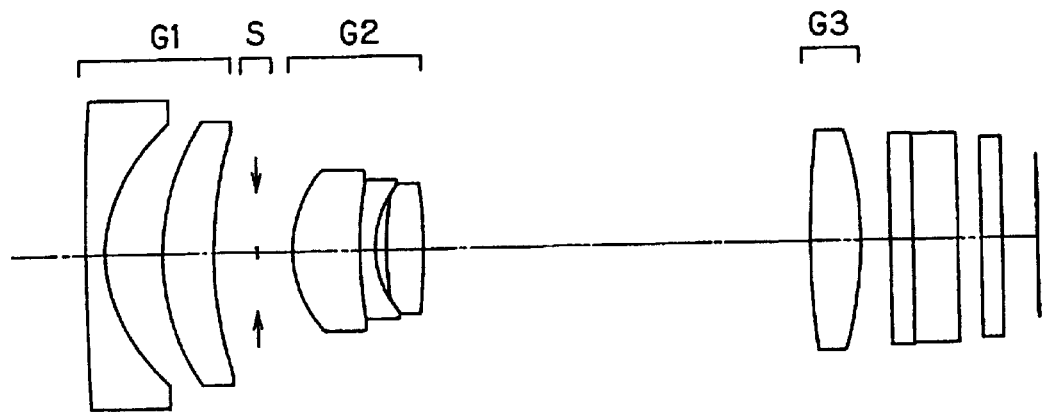

As shown in FIGS. 3(a), 3(b) and 3(c), Example 3 is directed to a zoom lens made up of a first lens group G1 composed of a negative meniscus lens convex on its object side and a positive meniscus lens convex on its object side and having negative refracting power, an aperture stop S, a second lens group G2 composed of a front subgroup and a rear subgroup wherein the front subgroup is composed of a doublet consisting of a positive meniscus lens convex on its object side and a negative meniscus lens convex on its object side and the rear subgroup is composed of one double-convex lens, and a third lens group G3 composed of one double-convex positive lens and having positive refracting power. Upon zooming from the wide-angle end to the telephoto end of the zoom lens, the first lens group G1 moves in a concave locus toward the object side of the zoom lens and positioned nearer to the image plane side of the zoom lens at the telephoto end than at the wide-angle end, the second lens group G2 moves together with the aperture stop S toward the object side, and the third lens group G3 moves in a convex locus toward the image plane side and positioned nearer to the image plane side at the telephoto end than at the wide-angle end. For focusing on a nearby subject, the third lens group G3 moves toward the object side.

Two aspheric surfaces are used; one at the image plane side-surface of the negative meniscus lens in the first lens group G1 and another at the object side-surface of the doublet in the front subgroup of the second lens group G2.

EXAMPLE 4

Figure 4A:
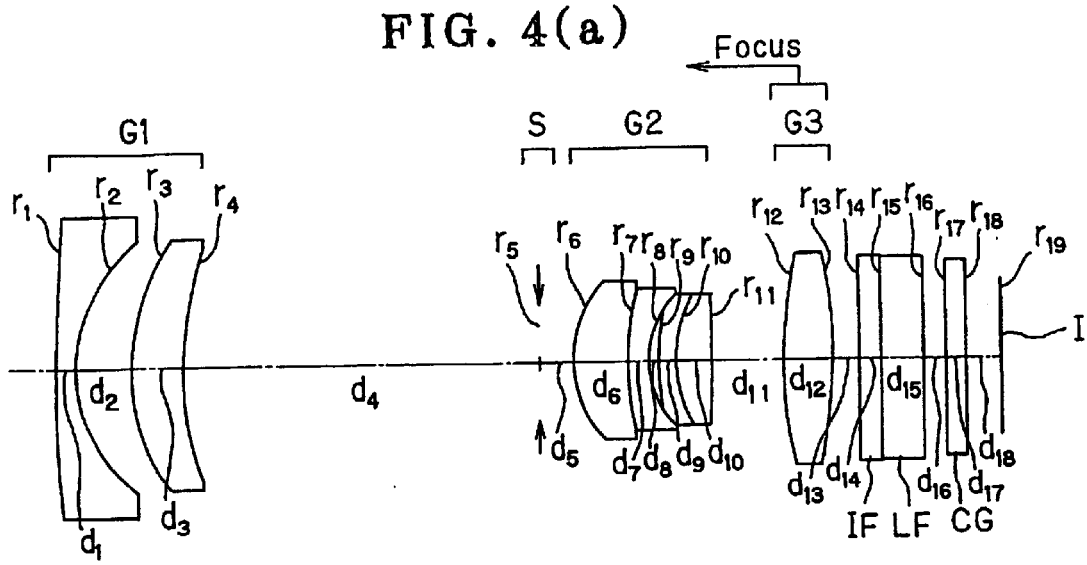
FIGS. 4(*a*), 4(*b*) and 4(*c*) are sectional views of Example 4 of the zoom lens, similar to FIGS. 1(*a*) to 1(*c*).
Figure 4B:
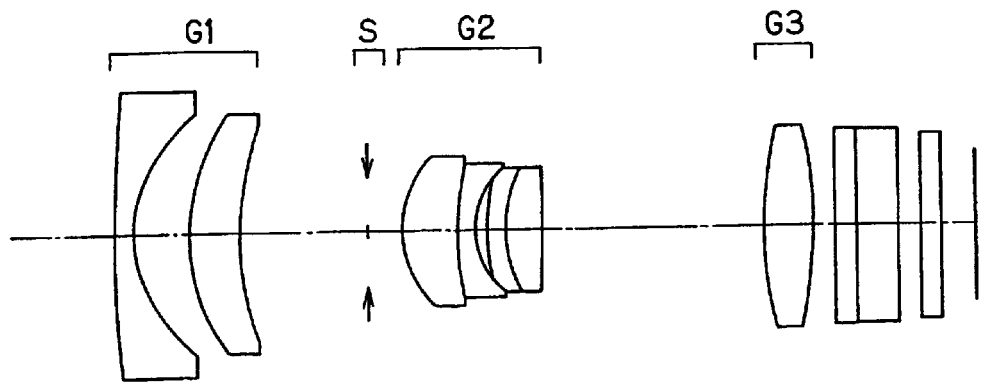
Figure 4C:
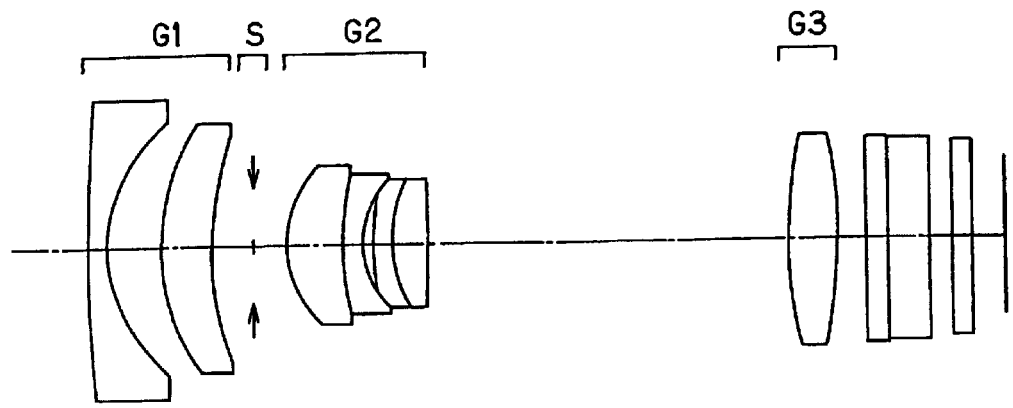

As shown in FIGS. 4(a), 4(b) and 4(c), Example 4 is directed to a zoom lens made up of a first lens group G1 composed of a negative meniscus lens convex on its object side and a positive meniscus lens convex on its object side and having negative refracting power, an aperture stop S, a second lens group G2 composed of a front subgroup and a rear subgroup wherein the front subgroup is composed of a doublet consisting of a positive meniscus lens convex on its object side and a negative meniscus lens convex on its object side and the rear subgroup is composed of a positive doublet consisting of a negative meniscus lens convex on its object side and a double-convex positive lens, and a third lens group G3 composed of one double-convex positive lens and having positive refracting power. Upon zooming from the wide-angle end to the telephoto end of the zoom lens, the first lens group G1 moves in a concave locus toward the object side of the zoom lens and positioned nearer to the image plane side of the zoom lens at the telephoto end than at the wide-angle end, the second lens group G2 moves together with the aperture stop S toward the object side, and the third lens group G3 moves in a convex locus toward the image plane side and positioned nearer to the object side at the telephoto end than at the wide-angle end. For focusing on a nearby subject, the third lens group G3 moves toward the object side.

Two aspheric surfaces are used; one at the image plane side-surface of the negative meniscus lens in the first lens group G1 and another at the object side-surface of the doublet in the front subgroup of the second lens group G2.

EXAMPLE 5

Figure 5A:
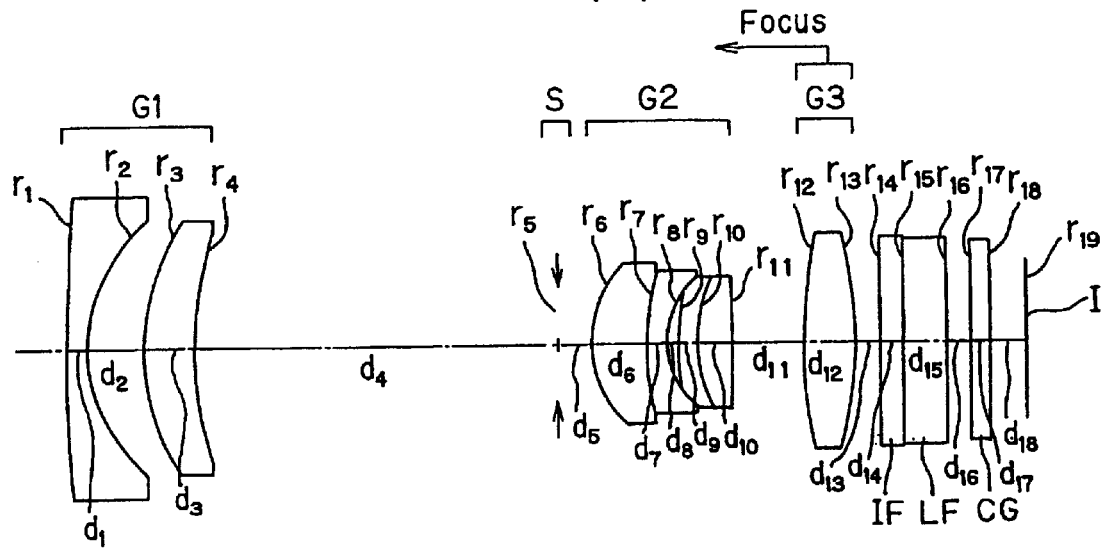
FIGS. 5(*a*), 5(*b*) and 5(*c*) are sectional views of Example 5 of the zoom lens, similar to FIGS. 1(*a*) to 1(*c*).
Figure 5B:
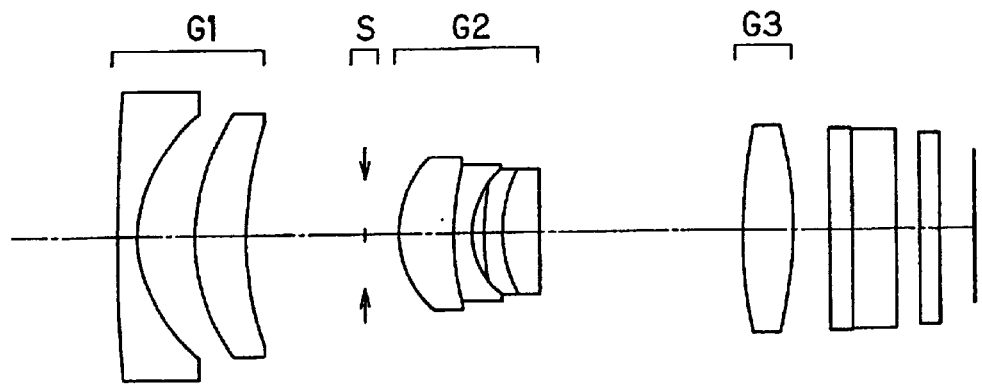
Figure 5C:
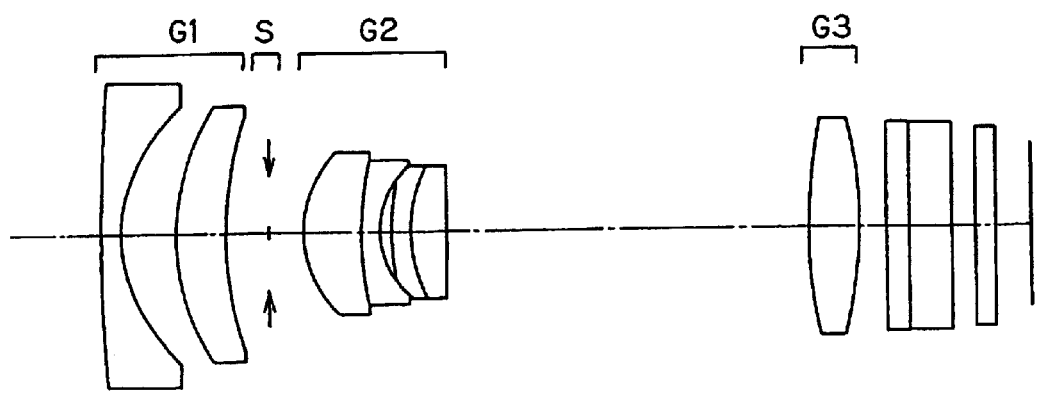

As shown in FIGS. 5(a), 5(b) and 5(c), Example 5 is directed to a zoom lens made up of a first lens group G1 composed of a negative meniscus lens convex on its object side and a positive meniscus lens convex on its object side and having negative refracting power, an aperture stop S, a second lens group G2 composed of a front subgroup and a rear subgroup wherein the front subgroup is composed of a doublet consisting of a positive meniscus lens convex on its object side and a negative meniscus lens convex on its object side and the rear subgroup is composed of a positive doublet consisting of a negative meniscus lens convex on its object side and a double-convex positive lens, and a third lens group G3 composed of one double-convex positive lens and having positive refracting power. Upon zooming from the wide-angle end to the telephoto end of the zoom lens, the first lens group G1 moves in a concave locus toward the object side of the zoom lens and positioned nearer to the image plane side of the zoom lens at the telephoto end than at the wide-angle end, the second lens group G2 moves together with the aperture stop S toward the object side, and the third lens group G3 moves in a convex locus toward the image plane side and positioned nearer to the object side at the telephoto end than at the wide-angle end. For focusing on a nearby subject, the third lens group G3 moves toward the object side.

Two aspheric surfaces are used; one at the image plane side-surface of the negative meniscus lens in the first lens group G1 and another at the object side-surface of the doublet in the front subgroup of the second lens group G2.

EXAMPLE 6

Figure 6A:
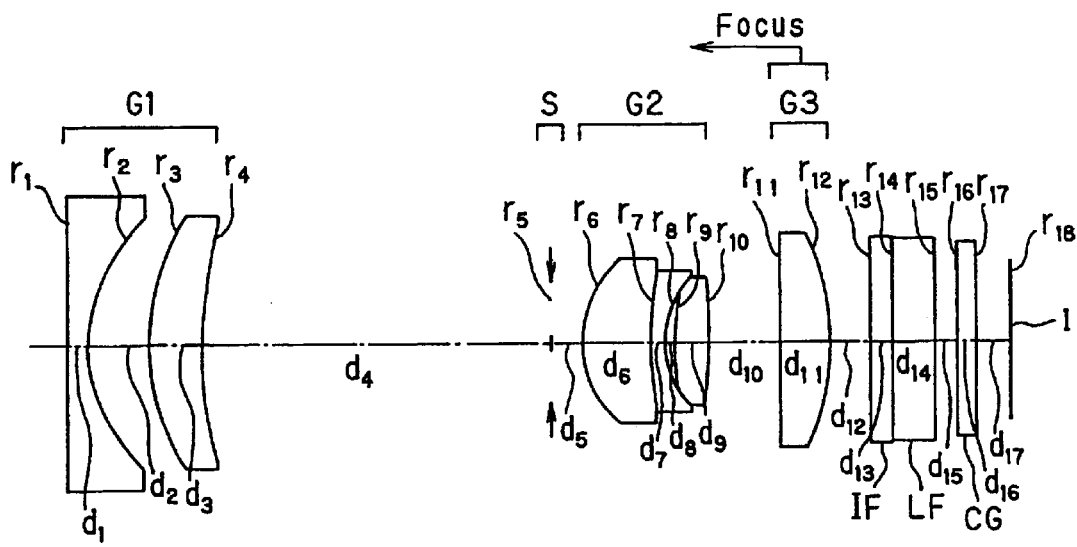
FIGS. 6(*a*), 6(*b*) and 6(*c*) are sectional views of Example 6 of the zoom lens, similar to FIGS. 1(*a*) to 1(*c*).
Figure 6B:
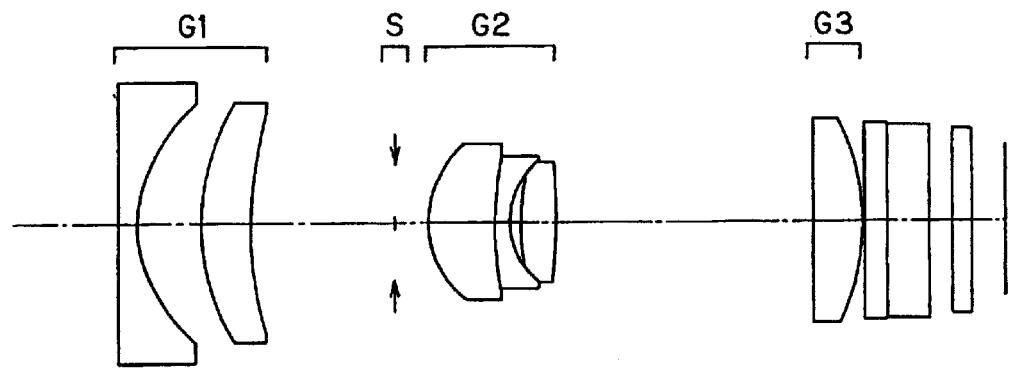
Figure 6C:
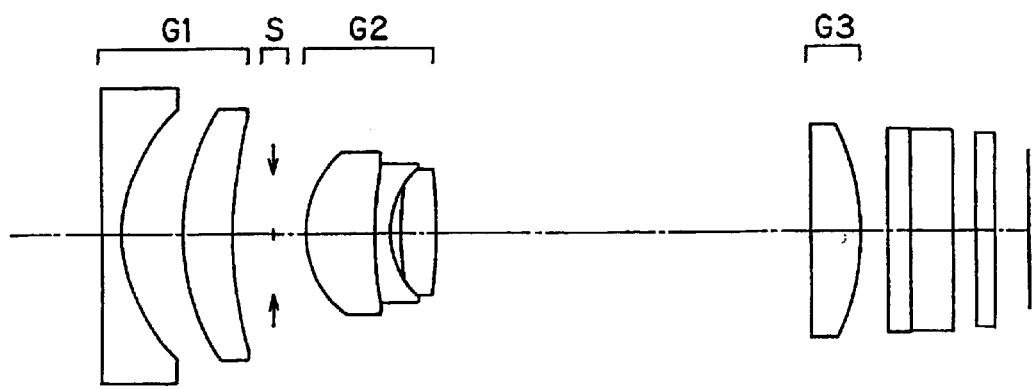

As shown in FIGS. 6(a), 6(b) and 6(c), Example 6 is directed to a zoom lens made up of a first lens group G1 composed of a negative meniscus lens convex on its object side and a positive meniscus lens convex on its object side and having negative refracting power, an aperture stop S, a second lens group G2 composed of a front subgroup and a rear subgroup wherein the front subgroup is composed of a doublet consisting of a positive meniscus lens convex on its object side and a negative meniscus lens convex on its object side and the rear subgroup is one double-convex lens, and a third lens group G3 composed of one double-convex positive lens and positive refracting power. Upon zooming from the wide-angle end to the telephoto end of the zoom lens, the first lens group G1 moves in a concave locus toward the object side of the zoom lens and positioned nearer to the image plane side of the zoom lens at the telephoto end than at the wide-angle end, the second lens group G2 moves together with the aperture stop S toward the object side, and the third lens group G3 moves in a convex locus toward the image plane side and positioned nearer to the image plane side at the telephoto end than at the wide-angle end. For focusing on a nearby subject, the third lens group G3 moves toward the object side.

Two aspheric surfaces are used; one at the image plane side-surface of the negative meniscus lens in the first lens group G1 and another at the object side-surface of the doublet in the front subgroup of the second lens group G2.

EXAMPLE 7

Figure 7A:
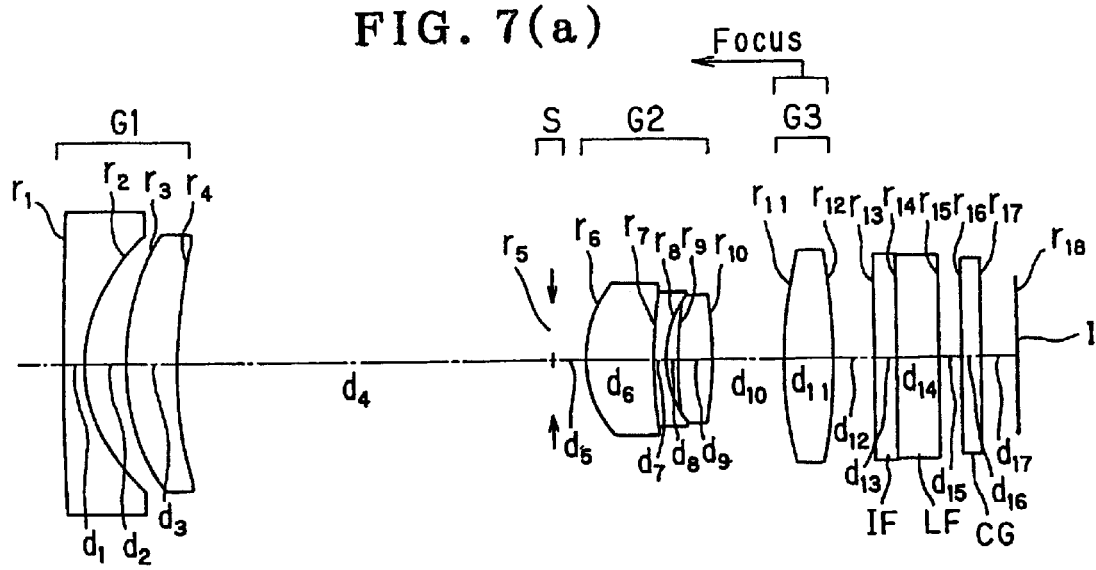
FIGS. 7(*a*), 7(*b*) and 7(*c*) are sectional views of Example 7 of the zoom lens, similar to FIGS. 1(*a*) to 1(*c*).
Figure 7B:
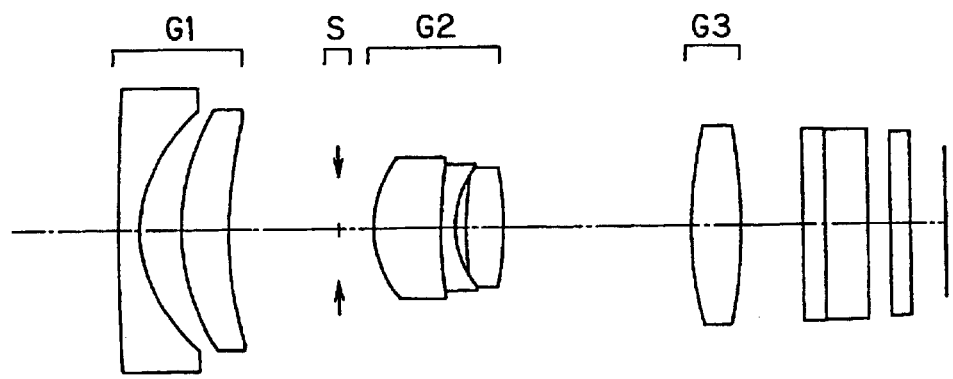
Figure 7C:
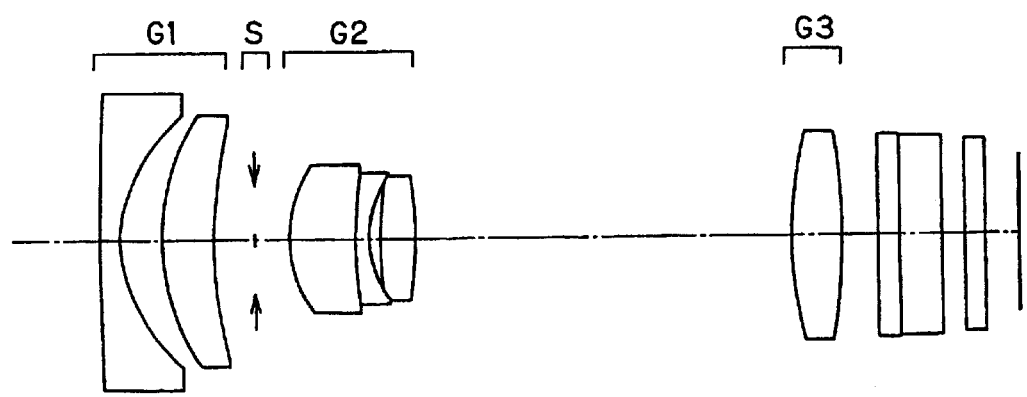

As shown in FIGS. 7(a), 7(b) and 7(c), Example 7 is directed to a zoom lens made up of a first lens group G1 composed of a negative meniscus lens convex on its object side and a positive meniscus lens convex on its object side and negative refracting power, an aperture stop S, a second lens group G2 composed of a front subgroup and a rear subgroup wherein the front subgroup is composed of a doublet consisting of a positive meniscus lens convex on its object side and a negative meniscus lens convex on its object side and the rear subgroup is one double-convex lens, and a third lens group G3 composed of one double-convex positive lens and having positive refracting power. Upon zooming from the wide-angle end to the telephoto end of the zoom lens, the first lens group G1 moves in a concave locus toward the object side of the zoom lens and positioned nearer to the image plane side of the zoom lens at the telephoto end than at the wide-angle end, the second lens group G2 moves together with the aperture stop S toward the object side, and the third lens group G3 moves in a convex locus toward the object side and positioned nearer to the image plane side at the telephoto end than at the wide-angle end. For focusing on a nearby subject, the third lens group G3 moves toward the object side.

Two aspheric surfaces are used; one at the image plane side-surface of the negative meniscus lens in the first lens group G1 and another at the object side-surface of the doublet in the front subgroup of the second lens group G2.

EXAMPLE 8

Figure 8A:
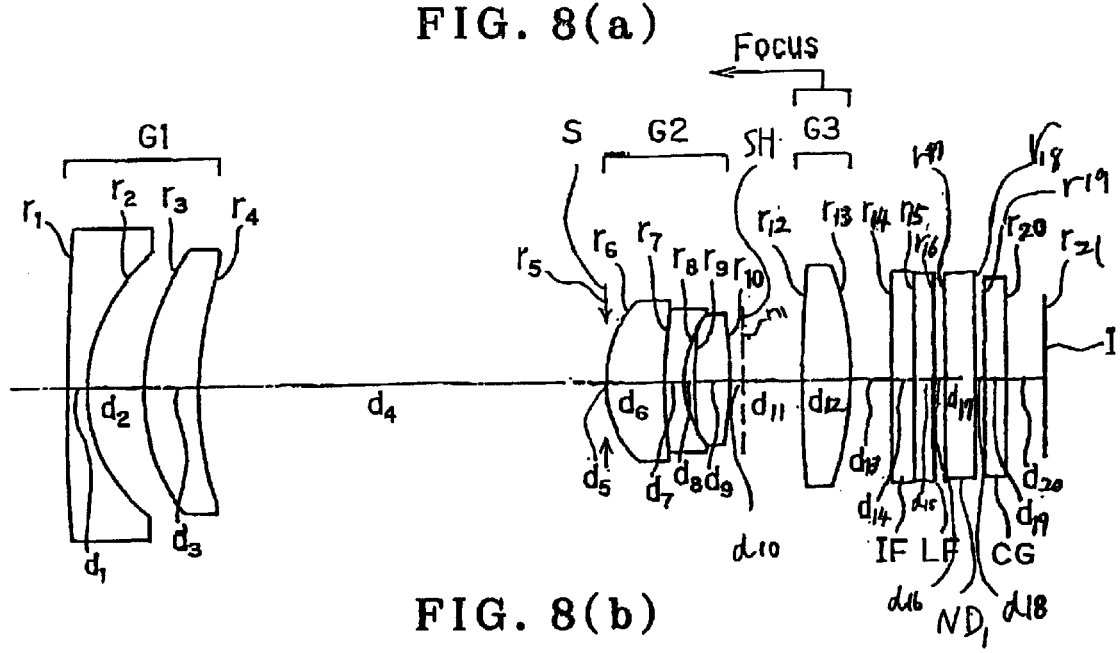
FIGS. 8(*a*), 8(*b*) and 8(*c*) are sectional views of Example 8 of the zoom lens, similar to FIGS. 1(*a*) to 1(*c*).
Figure 8B:
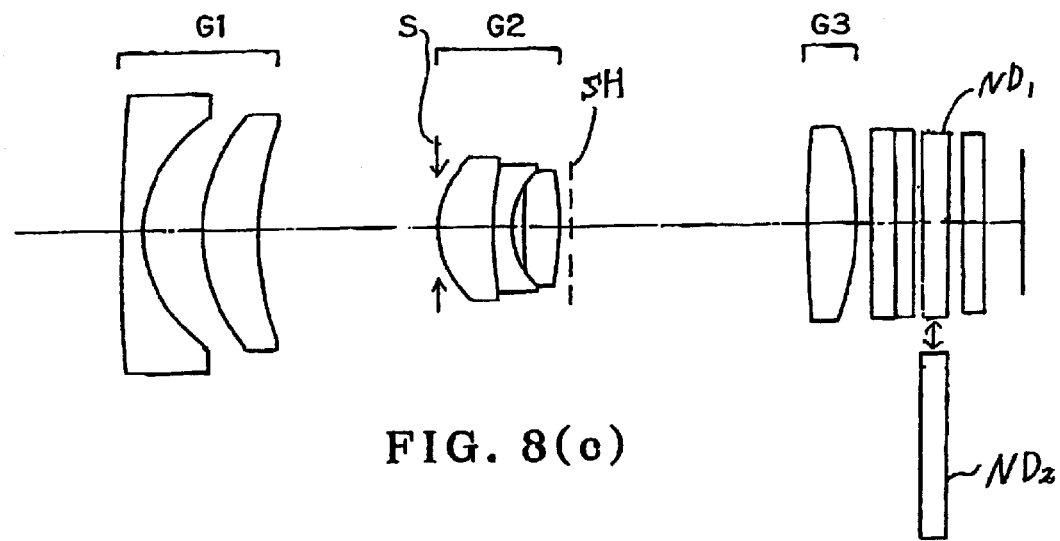
Figure 8C:
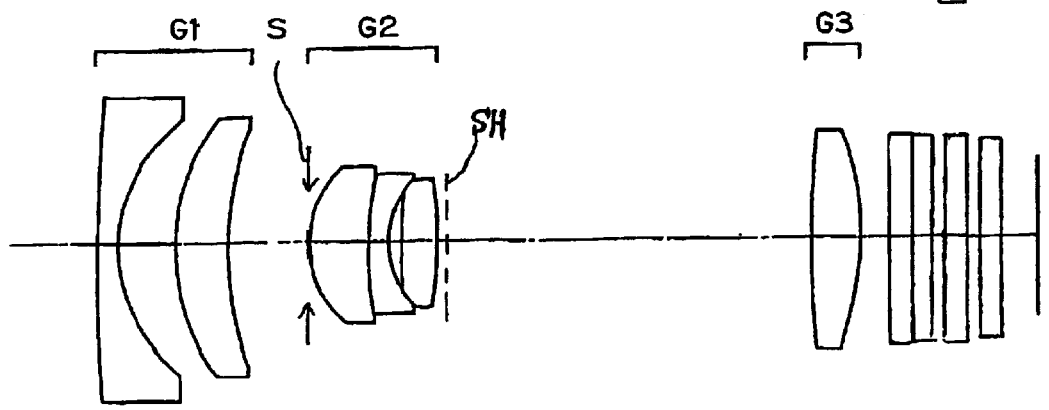

FIGS. 8(a), 8(b) and 8(c) are illustrative in section of Example 8 of the zoom lens, similar to FIGS. 1(a), 1(b) and 1(c). Example 8 is the same as in Example 1, except that an aperture stop S is positioned such that the surface apex of the lens surface $r_6$ nearest to the object side of the second lens group G2 coincides on the optical axis with a perpendicular from the aperture stop S down to the optical axis, which stop has a fixed aperture shape.

Additionally, a light quantity control mechanical shutter SH is located at a position 0.4 mm away from the surface $r_{10}$ toward the image side of the zoom lens, which surface is located nearest to the image plane side of the second lens group G2. For the shutter SH, it is acceptable to use an aperture arrangement wherein an aperture is opened or closed by a plurality of moving blades or a focal plane shutter used with single-lens reflex cameras or the like, wherein the quantity of light is controlled by movement of a moving screen. Alternatively, it is acceptable to use a liquid crystal shutter, etc.

In the instant example, during zooming the aperture stop S and mechanical shutter SH move together with the second lens group G2 on the optical axis of the zoom lens.

A low-pass filer LF is formed of three low-pass filter elements, each having a thickness of 0.2 mm, put one upon another. Each low-pass filter has crystallographic axes in horizontal and ±45° directions. Between the low-pass filter LF and a cover glass CG, a first ND filter $ND_1$ and a second ND filter $ND_2$ differing in transmittance from the first ND filter $ND_1$ are interchangeably located for the purpose of controlling the quantity of light. The ND filters $ND_1$ and $ND_2$ are interchangeable as by a turret.

In the instant example, the electronic image pickup device used has a horizontal pixel pitch, a, of 2 μm.

Numerical data on each example are enumerated below. Symbols used hereinafter but not hereinbefore have the following meanings:
f: focal length of the zoom lens
ω: half angle of view
$F_{NO}$: F-number
WE: wide-angle end
ST: standard or intermediate state
TE: telephoto end
$r_1, r_2, \ldots$ : radius of curvature of each lens surface
$d_1, d_2, \ldots$ : spacing between adjacent lens surfaces
$n_{d1}, n_{d2}, \ldots$ : d-line refractive index of each lens
$v_{d1}, v_2, \ldots$ : Abbe number of each lens element Here let x be an optical axis on condition that the direction of propagation of light is positive and y be a direction perpendicular to the optical axis. Then, aspheric configuration is given by $$x=(y^2/r)/[1+\{1-(K+1)(y/r)^2\}^{1/2}]+A_4 y^4+A_6 y^6+A_8 y^8+A_{10} y^{10}$$

where r is a paraxial radius of curvature, K is a conical coefficient, and $A_4, A_6, A_8$ and $A_{10}$ are the fourth, sixth, eigth and tenth aspheric coefficients, respectively.

EXAMPLE 1

| | | | | | | | |
|---|---|---|---|---|---|---|---|
| $r_1$ | = | 79.4668 | $d_1$ | = | 0.7000 | $n_{d1}$ = 1.74320 | $\nu_{d1}$ = 49.34 |
| $r_2$ | = | 5.0248(Aspheric) | $d_2$ | = | 2.0000 | | |
| $r_3$ | = | 7.7722 | $d_3$ | = | 1.8000 | $n_{d2}$ = 1.84666 | $\nu_{d2}$ = 23.78 |
| $r_4$ | = | 12.8300 | $d_4$ | = | (Variable) | | |
| $r_5$ | = | ∞ (Stop) | $d_5$ | = | 1.2000 | | |
| $r_6$ | = | 3.8190(Aspheric) | $d_6$ | = | 2.0000 | $n_{d3}$ = 1.80610 | $\nu_{d3}$ = 40.92 |
| $r_7$ | = | 14.0000 | $d_7$ | = | 0.7000 | $n_{d4}$ = 1.84666 | $\nu_{d4}$ = 23.78 |
| $r_8$ | = | 3.2333 | $d_8$ | = | 0.4000 | | |
| $r_9$ | = | 13.6941 | $d_9$ | = | 1.3000 | $n_{d5}$ = 1.69350 | $\nu_{d5}$ = 53.21 |
| $r_{10}$ | = | −13.6343 | $d_{10}$ | = | (Variable) | | |
| $r_{11}$ | = | 41.4339 | $d_{11}$ | = | 1.8000 | $n_{d6}$ = 1.48749 | $\nu_{d6}$ = 70.23 |
| $r_{12}$ | = | −10.8130 | $d_{12}$ | = | (Variable) | | |
| $r_{13}$ | = | ∞ | $d_{13}$ | = | 0.8000 | $n_{d7}$ = 1.51633 | $\nu_{d7}$ = 64.14 |
| $r_{14}$ | = | ∞ | $d_{14}$ | = | 1.5000 | $n_{d8}$ = 1.54771 | $\nu_{d8}$ = 62.84 |
| $r_{15}$ | = | ∞ | $d_{15}$ | = | 0.8000 | | |
| $r_{16}$ | = | ∞ | $d_{16}$ | = | 0.7500 | $n_{d9}$ = 1.51633 | $\nu_{d9}$ = 64.14 |
| $r_{17}$ | = | ∞ | $d_{17}$ | = | 1.2098 | | |
| $r_{18}$ | = | ∞ (Image Plane) | | | | | |

Aspherical Coefficients
2nd surface

K = 0
$A_4$ = −6.4687 × 10$^{-4}$
$A_6$ = 7.9816 × 10$^{-6}$
$A_8$ = −2.0304 × 10$^{-6}$
$A_{10}$ = 0.0000

6th surface

K = 0
$A_4$ = −9.5187 × 10$^{-4}$
$A_6$ = −4.3656 × 10$^{-6}$
$A_8$ = −7.0479 × 10$^{-6}$
$A_{10}$ = 0.0000

| Zooming Data (∞) | WE | ST | TE |
|---|---|---|---|
| f (mm) | 4.52153 | 8.69162 | 12.89380 |
| $F_{NO}$ | 2.6748 | 3.6906 | 4.5245 |
| ω (°) | 33.1 | 18.2 | 12.5 |
| $d_4$ | 13.11868 | 5.07598 | 1.50000 |
| $d_{10}$ | 2.53628 | 8.72101 | 13.15846 |
| $d_{12}$ | 1.40000 | 0.50385 | 0.99490 |

EXAMPLE 2

| | | | | | | | | | |
|---|---|---|---|---|---|---|---|---|---|
| $r_1$ | = | 74.8530 | $d_1$ | = | 0.7000 | $n_{d1}$ | = | 1.74320 | $\nu_{d1}$ = 49.34 |
| $r_2$ | = | 4.9774(Aspheric) | $d_2$ | = | 2.0000 | | | | |
| $r_3$ | = | 7.9510 | $d_3$ | = | 1.8000 | $n_{d2}$ | = | 1.84666 | $\nu_{d2}$ = 23.78 |
| $r_4$ | = | 13.0310 | $d_4$ | = | (Variable) | | | | |
| $r_5$ | = | ∞ (Stop) | $d_5$ | = | 1.2000 | | | | |
| $r_6$ | = | 3.7607(Aspheric) | $d_6$ | = | 2.0000 | $n_{d3}$ | = | 1.80610 | $\nu_{d3}$ = 40.92 |
| $r_7$ | = | 10.0000 | $d_7$ | = | 0.7000 | $n_{d4}$ | = | 1.84666 | $\nu_{d4}$ = 23.78 |
| $r_8$ | = | 3.0755 | $d_8$ | = | 0.4000 | | | | |
| $r_9$ | = | 7.5308 | $d_9$ | = | 0.7000 | $n_{d5}$ | = | 1.80610 | $\nu_{d5}$ = 40.92 |
| $r_{10}$ | = | 5.0000 | $d_{10}$ | = | 1.3000 | $n_{d6}$ | = | 1.69350 | $\nu_{d6}$ = 53.21 |
| $r_{11}$ | = | −28.2295 | $d_{11}$ | = | (Variable) | | | | |
| $r_{12}$ | = | 21.7265 | $d_{12}$ | = | 1.8000 | $n_{d7}$ | = | 1.48749 | $\nu_{d7}$ = 70.23 |
| $r_{13}$ | = | −13.6621 | $d_{13}$ | = | (Variable) | | | | |
| $r_{14}$ | = | ∞ | $d_{14}$ | = | 0.8000 | $n_{d8}$ | = | 1.51633 | $\nu_{d8}$ = 64.14 |
| $r_{15}$ | = | ∞ | $d_{15}$ | = | 1.5000 | $n_{d9}$ | = | 4.54771 | $\nu_{d9}$ = 62.84 |
| $r_{16}$ | = | ∞ | $d_{16}$ | = | 0.8000 | | | | |
| $r_{17}$ | = | ∞ | $d_{17}$ | = | 0.7500 | $n_{d10}$ | = | 1.51633 | $\nu_{d10}$ = 64.14 |
| $r_{18}$ | = | ∞ | $d_{18}$ | = | 1.2103 | | | | |
| $r_{19}$ | = | ∞ (Image Plane) | | | | | | | |

Aspherical Coefficients
2nd surface

K = 0
$A_4$ = −7.1677 × 10$^{-4}$
$A_6$ = 8.7136 × 10$^{-6}$

-continued

| | | |
|---|---|---|
| $A_8$ | = | $-2.1419 \times 10^{-6}$ |
| $A_{10}$ | = | 0.0000 |

6th surface

| | | |
|---|---|---|
| K | = | 0 |
| $A_4$ | = | $-9.8304 \times 10^{-4}$ |
| $A_6$ | = | $3.1379 \times 10^{-5}$ |
| $A_8$ | = | $-1.0946 \times 10^{-5}$ |
| $A_{10}$ | = | 0.0000 |

| Zooming Data (∞) | WE | ST | TE |
|---|---|---|---|
| f (mm) | 4.52231 | 8.69266 | 12.89211 |
| $F_{NO}$ | 2.6761 | 3.6375 | 4.5057 |
| ω (°) | 33.2 | 18.2 | 12.4 |
| $d_4$ | 12.90902 | 4.75984 | 1.50000 |
| $d_{11}$ | 2.53628 | 8.06111 | 12.76886 |
| $d_{13}$ | 0.92173 | 0.58219 | 0.99073 |

EXAMPLE 3

| | | | | | | | |
|---|---|---|---|---|---|---|---|
| $r_1$ | = | 101.7730 | $d_1$ | = | 0.7000 | $n_{d1}$ = 1.74320 | $ν_{d1}$ = 49.34 |
| $r_2$ | = | 4.9524(Aspheric) | $d_2$ | = | 2.0000 | | |
| $r_3$ | = | 8.0585 | $d_3$ | = | 1.8000 | $n_{d2}$ = 1.84666 | $ν_{d2}$ = 23.78 |
| $r_4$ | = | 14.1035 | $d_4$ | = | (Variable) | | |
| $r_5$ | = | ∞ (Stop) | $d_5$ | = | 1.2000 | | |
| $r_6$ | = | 3.9001(Aspheric) | $d_6$ | = | 2.4000 | $n_{d3}$ = 1.74320 | $ν_{d3}$ = 49.34 |
| $r_7$ | = | 14.0000 | $d_7$ | = | 0.5000 | $n_{d4}$ = 1.76182 | $ν_{d4}$ = 26.52 |
| $r_8$ | = | 3.2874 | $d_8$ | = | 0.4000 | | |
| $r_9$ | = | 10.5369 | $d_9$ | = | 1.3000 | $n_{d5}$ = 1.69680 | $ν_{d5}$ = 55.53 |
| $r_{10}$ | = | −19.8468 | $d_{10}$ | = | (Variable) | | |
| $r_{11}$ | = | 28.0501 | $d_{11}$ | = | 1.8000 | $n_{d6}$ = 1.48749 | $ν_{d6}$ = 70.23 |
| $r_{12}$ | = | −12.6143 | $d_{12}$ | = | (Variable) | | |
| $r_{13}$ | = | ∞ | $d_{13}$ | = | 0.8000 | $n_{d7}$ = 1.51633 | $ν_{d7}$ = 64.14 |
| $r_{14}$ | = | ∞ | $d_{14}$ | = | 1.5000 | $n_{d8}$ = 1.54771 | $ν_{d8}$ = 62.84 |
| $r_{15}$ | = | ∞ | $d_{15}$ | = | 0.8000 | | |
| $r_{16}$ | = | ∞ | $d_{16}$ | = | 0.7500 | $n_{d9}$ = 1.51633 | $ν_{d9}$ = 64.14 |
| $r_{17}$ | = | ∞ | $d_{17}$ | = | 1.2103 | | |
| $r_{18}$ | = | ∞ (Image Plane) | | | | | |

Aspherical Coefficients
2nd surface

| | | |
|---|---|---|
| K | = | 0 |
| $A_4$ | = | $-7.4225 \times 10^{-4}$ |
| $A_6$ | = | $7.6783 \times 10^{-6}$ |
| $A_8$ | = | $-2.2251 \times 10^{-6}$ |
| $A_{10}$ | = | 0.0000 |

6th surface

| | | |
|---|---|---|
| K | = | 0 |
| $A_4$ | = | $-9.8353 \times 10^{-4}$ |
| $A_6$ | = | $1.6303 \times 10^{-5}$ |
| $A_8$ | = | $-8.4179 \times 10^{-6}$ |
| $A_{10}$ | = | 0.0000 |

| Zooming Data (∞) | WE | ST | TE |
|---|---|---|---|
| f (mm) | 4.51871 | 8.69212 | 12.89425 |
| $F_{NO}$ | 2.6732 | 3.7006 | 4.5455 |
| ω (°) | 33.2 | 18.2 | 12.4 |
| $d_4$ | 12.92007 | 5.01579 | 1.50000 |
| $d_{10}$ | 2.53628 | 8.88667 | 13.44429 |
| $d_{12}$ | 1.40000 | 0.48446 | 0.99163 |

EXAMPLE 4

| | | | | | | | |
|---|---|---|---|---|---|---|---|
| $r_1$ | = | 53.8980 | $d_1$ | = | 0.7000 | $n_{d1}$ = 1.74320 | $ν_{d1}$ = 49.34 |
| $r_2$ | = | 5.0423(Aspheric) | $d_2$ | = | 2.0000 | | |

-continued

| | | | | | | | | |
|---|---|---|---|---|---|---|---|---|
| $r_3$ = | 7.8354 | $d_3$ = | 1.8000 | $n_{d2}$ = | 1.84666 | $\nu_{d2}$ = | 23.78 |
| $r_4$ = | 11.9718 | $d_4$ = | (Variable) | | | | |
| $r_5$ = | ∞ (Stop) | $d_5$ = | 1.2000 | | | | |
| $r_6$ = | 3.6614(Aspheric) | $d_6$ = | 2.0000 | $n_{d3}$ = | 1.74320 | $\nu_{d3}$ = | 49.34 |
| $r_7$ = | 10.0000 | $d_7$ = | 0.7000 | $n_{d4}$ = | 1.76182 | $\nu_{d4}$ = | 26.52 |
| $r_8$ = | 3.0042 | $d_8$ = | 0.4000 | | | | |
| $r_9$ = | 9.1592 | $d_9$ = | 0.7000 | $n_{d5}$ = | 1.59551 | $\nu_{d5}$ = | 39.24 |
| $r_{10}$ = | 5.0000 | $d_{10}$ = | 1.3000 | $n_{d6}$ = | 1.77250 | $\nu_{d6}$ = | 49.60 |
| $r_{11}$ = | −117.2730 | $d_{11}$ = | (Variable) | | | | |
| $r_{12}$ = | 15.9517 | $d_{12}$ = | 1.8000 | $n_{d7}$ = | 1.48749 | $\nu_{d7}$ = | 70.23 |
| $r_{13}$ = | −17.8228 | $d_{13}$ = | (Variable) | | | | |
| $r_{14}$ = | ∞ | $d_{14}$ = | 0.8000 | $n_{d8}$ = | 1.51633 | $\nu_{d8}$ = | 64.14 |
| $r_{15}$ = | ∞ | $d_{15}$ = | 1.5000 | $n_{d9}$ = | 1.54771 | $\nu_{d9}$ = | 62.84 |
| $r_{16}$ = | ∞ | $d_{16}$ = | 0.8000 | | | | |
| $r_{17}$ = | ∞ | $d_{17}$ = | 0.7500 | $n_{d10}$ = | 1.51633 | $\nu_{d10}$ = | 64.14 |
| $r_{18}$ = | ∞ | $d_{18}$ = | 1.2107 | | | | |
| $r_{19}$ = | ∞ (Image Plane) | | | | | | |

Aspherical Coefficients
2nd surface

K = 0
$A_4$ = −6.8299 × 10$^{-4}$
$A_6$ = 1.0852 × 10$^{-5}$
$A_8$ = −1.9749 × 10$^{-6}$
$A_{10}$ = 0.0000

6th surface

K = 0
$A_4$ = −1.1584 × 10$^{-3}$
$A_6$ = 5.8468 × 10$^{-5}$
$A_8$ = −1.5685 × 10$^{-5}$
$A_{10}$ = 0.0000

| Zooming Data (∞) | WE | ST | TE |
|---|---|---|---|
| f (mm) | 4.52183 | 8.69754 | 12.89068 |
| $F_{NO}$ | 2.6711 | 3.6016 | 4.4763 |
| ω (°) | 33.2 | 18.2 | 12.4 |
| $d_4$ | 12.91311 | 4.64116 | 1.50000 |
| $d_{11}$ | 2.53628 | 7.96154 | 12.89132 |
| $d_{13}$ | 0.92173 | 0.73097 | 0.98383 |

EXAMPLE 5

| | | | | | | | | |
|---|---|---|---|---|---|---|---|---|
| $r_1$ = | 64.1337 | $d_1$ = | 0.7000 | $n_{d1}$ = | 1.74320 | $\nu_{d1}$ = | 49.34 |
| $r_2$ = | 5.0405(Aspheric) | $d_2$ = | 2.0000 | | | | |
| $r_3$ = | 7.8601 | $d_3$ = | 1.8000 | $n_{d2}$ = | 1.84666 | $\nu_{d2}$ = | 23.78 |
| $r_4$ = | 12.3412 | $d_4$ = | (Variable) | | | | |
| $r_5$ = | ∞ (Stop) | $d_5$ = | 1.2000 | | | | |
| $r_6$ = | 3.6368(Aspheric) | $d_6$ = | 2.0000 | $n_{d3}$ = | 1.74320 | $\nu_{d3}$ = | 49.34 |
| $r_7$ = | 10.0000 | $d_7$ = | 0.7000 | $n_{d4}$ = | 1.76182 | $\nu_{d4}$ = | 26.52 |
| $r_8$ = | 2.9808 | $d_8$ = | 0.4000 | | | | |
| $r_9$ = | 9.0622 | $d_9$ = | 0.7000 | $n_{d5}$ = | 1.59551 | $\nu_{d5}$ = | 39.24 |
| $r_{10}$ = | 5.0000 | $d_{10}$ = | 1.3000 | $n_{d6}$ = | 1.77250 | $\nu_{d6}$ = | 49.60 |
| $r_{11}$ = | −141.3919 | $d_{11}$ = | (Variable) | | | | |
| $r_{12}$ = | 17.3027 | $d_{12}$ = | 1.8000 | $n_{d7}$ = | 1.48749 | $\nu_{d7}$ = | 70.23 |
| $r_{13}$ = | −16.4797 | $d_{13}$ = | (Variable) | | | | |
| $r_{14}$ = | ∞ | $d_{14}$ = | 0.8000 | $n_{d8}$ = | 1.51633 | $\nu_{d8}$ = | 64.14 |
| $r_{15}$ = | ∞ | $d_{15}$ = | 1.5000 | $n_{d9}$ = | 1.54771 | $\nu_{d9}$ = | 62.84 |
| $r_{16}$ = | ∞ | $d_{16}$ = | 0.8000 | | | | |
| $r_{17}$ = | ∞ | $d_{17}$ = | 0.7500 | $n_{d10}$ = | 1.51633 | $\nu_{d10}$ = | 64.14 |
| $r_{18}$ = | ∞ | $d_{18}$ = | 1.2111 | | | | |
| $r_{19}$ = | ∞ (Image Plane) | | | | | | |

Aspherical Coefficients
2nd surface

K = 0
$A_4$ = −6.6041 × 10$^{-4}$
$A_6$ = 3.9242 × 10$^{-6}$
$A_8$ = −1.7226 × 10$^{-6}$
$A_{10}$ = 0.0000

-continued

| 6th surface | | |
|---|---|---|
| K | = | 0 |
| $A_4$ | = | $-1.0437 \times 10^{-3}$ |
| $A_6$ | = | $6.3082 \times 10^{-6}$ |
| $A_8$ | = | $-9.2395 \times 10^{-6}$ |
| $A_{10}$ | = | 0.0000 |

| Zooming Data (∞) | WE | ST | TE |
|---|---|---|---|
| f (mm) | 4.52515 | 8.68502 | 12.89196 |
| $F_{NO}$ | 2.6711 | 3.6016 | 4.4763 |
| ω (°) | 33.2 | 18.2 | 12.4 |
| $d_4$ | 12.92228 | 4.23438 | 1.50000 |
| $d_{11}$ | 2.53628 | 7.22848 | 12.85864 |
| $d_{13}$ | 0.92173 | 1.27616 | 0.95077 |

EXAMPLE 6

| $r_1$ | = | 1222.6993 | $d_1$ | = | 0.7000 | $n_{d1}$ = 1.74320 | $v_{d1}$ = 49.34 |
|---|---|---|---|---|---|---|---|
| $r_2$ | = | 5.1102(Aspheric) | $d_2$ | = | 2.3000 | | |
| $r_3$ | = | 8.6156 | $d_3$ | = | 1.8000 | $n_{d2}$ = 1.84666 | $v_{d2}$ = 23.78 |
| $r_4$ | = | 15.1617 | $d_4$ | = | (Variable) | | |
| $r_5$ | = | ∞ (Stop) | $d_5$ | = | 1.2000 | | |
| $r_6$ | = | 3.6484(Aspheric) | $d_6$ | = | 2.4000 | $n_{d3}$ = 1.74320 | $v_{d3}$ = 49.34 |
| $r_7$ | = | 14.0000 | $d_7$ | = | 0.5000 | $n_{d4}$ = 1.76182 | $v_{d4}$ = 26.52 |
| $r_8$ | = | 2.9849 | $d_8$ | = | 0.4000 | | |
| $r_9$ | = | 9.5353 | $d_9$ | = | 1.3000 | $n_{d5}$ = 1.69680 | $v_{d5}$ = 55.53 |
| $r_{10}$ | = | −23.1679 | $d_{10}$ | = | (Variable) | | |
| $r_{11}$ | = | 162.2932 | $d_{11}$ | = | 1.8000 | $n_{d6}$ = 1.48749 | $v_{d6}$ = 70.23 |
| $r_{12}$ | = | −9.4592 | $d_{12}$ | = | (Variable) | | |
| $r_{13}$ | = | ∞ | $d_{13}$ | = | 0.8000 | $n_{d7}$ = 1.51633 | $v_{d7}$ = 64.14 |
| $r_{14}$ | = | ∞ | $d_{14}$ | = | 1.5000 | $n_{d8}$ = 1.54771 | $v_{d8}$ = 62.84 |
| $r_{15}$ | = | ∞ | $d_{15}$ | = | 0.8000 | | |
| $r_{16}$ | = | ∞ | $d_{16}$ | = | 0.7500 | $n_{d9}$ = 1.51633 | $v_{d9}$ = 64.14 |
| $r_{17}$ | = | ∞ | $d_{17}$ | = | 1.2110 | | |
| $r_{18}$ | = | ∞ (Image Plane) | | | | | |

Aspherical Coefficients
2nd surface

| K | = | 0 |
|---|---|---|
| $A_4$ | = | $-6.1769 \times 10^{-4}$ |
| $A_6$ | = | $-1.3710 \times 10^{-5}$ |
| $A_8$ | = | $-1.1507 \times 10^{-6}$ |
| $A_{10}$ | = | 0.0000 |

6th surface

| K | = | 0 |
|---|---|---|
| $A_4$ | = | $-1.0950 \times 10^{-3}$ |
| $A_6$ | = | $-1.0073 \times 10^{-5}$ |
| $A_8$ | = | $-9.4151 \times 10^{-6}$ |
| $A_{10}$ | = | 0.0000 |

| Zooming Data (∞) | WE | ST | TE |
|---|---|---|---|
| f (mm) | 4.50866 | 8.69009 | 12.89766 |
| $F_{NO}$ | 2.6317 | 3.7132 | 4.5398 |
| ω (°) | 33.2 | 18.3 | 12.5 |
| $d_4$ | 12.61998 | 5.18238 | 1.50000 |
| $d_{10}$ | 2.53628 | 9.22459 | 13.39784 |
| $d_{12}$ | 1.40000 | 0.06458 | 0.98584 |

EXAMPLE 7

| $r_1$ | = | 112.8905 | $d_1$ | = | 0.7000 | $n_{d1}$ = 1.74320 | $v_{d1}$ = 49.34 |
|---|---|---|---|---|---|---|---|
| $r_2$ | = | 4.9825(Aspheric) | $d_2$ | = | 1.5000 | | |
| $r_3$ | = | 8.2609 | $d_3$ | = | 1.8000 | $n_{d2}$ = 1.84666 | $v_{d2}$ = 23.78 |
| $r_4$ | = | 16.6551 | $d_4$ | = | (Variable) | | |

-continued

| | | | | | | | | |
|---|---|---|---|---|---|---|---|---|
| $r_5$ | = | ∞ (Stop) | $d_5$ | = | 1.2000 | | | |
| $r_6$ | = | 4.1386(Aspheric) | $d_6$ | = | 2.4000 | $n_{d3}$ = 1.74320 | $\nu_{d3}$ = 49.34 | |
| $r_7$ | = | 15.0000 | $d_7$ | = | 0.5000 | $n_{d4}$ = 1.78472 | $\nu_{d4}$ = 25.68 | |
| $r_8$ | = | 3.7176 | $d_8$ | = | 0.4000 | | | |
| $r_9$ | = | 15.3140 | $d_9$ | = | 1.3000 | $n_{d5}$ = 1.69680 | $\nu_{d5}$ = 55.53 | |
| $r_{10}$ | = | −14.0582 | $d_{10}$ | = | (Variable) | | | |
| $r_{11}$ | = | 14.3452 | $d_{11}$ | = | 1.8000 | $n_{d6}$ = 1.48749 | $\nu_{d6}$ = 70.23 | |
| $r_{12}$ | = | −20.9119 | $d_{12}$ | = | (Variable) | | | |
| $r_{13}$ | = | ∞ | $d_{13}$ | = | 0.8000 | $n_{d7}$ = 1.51633 | $\nu_{d7}$ = 64.14 | |
| $r_{14}$ | = | ∞ | $d_{14}$ | = | 1.5000 | $n_{d8}$ = 1.54771 | $\nu_{d8}$ = 62.84 | |
| $r_{15}$ | = | ∞ | $d_{15}$ | = | 0.8000 | | | |
| $r_{16}$ | = | ∞ | $d_{16}$ | = | 0.7500 | $n_{d9}$ = 1.51633 | $\nu_{d9}$ = 64.14 | |
| $r_{17}$ | = | ∞ | $d_{17}$ | = | 1.2095 | | | |
| $r_{18}$ | = | ∞ (Image Plane) | | | | | | |

Aspherical Coefficients
2nd surface

K = 0
$A_4$ = −9.5137 × 10$^{-4}$
$A_6$ = 2.9365 × 10$^{-5}$
$A_8$ = −2.8240 × 10$^{-6}$
$A_{10}$ = 0.0000

6th surface

K = 0
$A_4$ = −8.2800 × 10$^{-4}$
$A_6$ = −2.6060 × 10$^{-5}$
$A_8$ = −1.8567 × 10$^{-6}$
$A_{10}$ = 0.0000

| Zooming Data (∞) | WE | ST | TE |
|---|---|---|---|
| f (mm) | 4.53489 | 8.69200 | 12.89037 |
| $F_{NO}$ | 2.7246 | 3.4964 | 4.5292 |
| ω (°) | 33.1 | 18.2 | 12.4 |
| $d_4$ | 13.41716 | 3.93742 | 1.50000 |
| $d_{10}$ | 2.53628 | 6.78431 | 13.38548 |
| $d_{12}$ | 1.40000 | 2.11513 | 1.18421 |

EXAMPLE 8

| | | | | | | | | | | |
|---|---|---|---|---|---|---|---|---|---|---|
| $r_1$ | = | 79.4668 | $d_1$ | = | 0.7000 | $n_{d1}$ | = | 1.74320 | $\nu_{d1}$ = | 49.34 |
| $r_2$ | = | 5.0248(Aspheric) | $d_2$ | = | 2.0000 | | | | | |
| $r_3$ | = | 7.7722 | $d_3$ | = | 1.8000 | $n_{d2}$ | = | 1.84666 | $\nu_{d2}$ = | 23.78 |
| $r_4$ | = | 12.8300 | $d_4$ | = | (Variable) | | | | | |
| $r_5$ | = | ∞ (Stop) | $d_5$ | = | 0.0000 | | | | | |
| $r_6$ | = | 3.8190(Aspheric) | $d_6$ | = | 2.0000 | $n_{d3}$ | = | 1.80610 | $\nu_{d3}$ = | 40.92 |
| $r_7$ | = | 14.0000 | $d_7$ | = | 0.7000 | $n_{d4}$ | = | 1.84666 | $\nu_{d4}$ = | 23.78 |
| $r_8$ | = | 3.2333 | $d_8$ | = | 0.4000 | | | | | |
| $r_9$ | = | 13.6941 | $d_9$ | = | 1.3000 | $n_{d5}$ | = | 1.69350 | $\nu_{d5}$ = | 53.21 |
| $r_{10}$ | = | −13.6343 | $d_{10}$ | = | 0.4000 | | | | | |
| $r_{11}$ | = | ∞ (Shutter) | $d_{11}$ | = | (Variable) | | | | | |
| $r_{12}$ | = | 41.4339 | $d_{12}$ | = | 1.8000 | $n_{d6}$ | = | 1.48749 | $\nu_{d6}$ = | 70.23 |
| $r_{13}$ | = | −10.8130 | $d_{13}$ | = | (Variable) | | | | | |
| $r_{14}$ | = | ∞ | $d_{14}$ | = | 0.8000 | $n_{d7}$ | = | 1.51633 | $\nu_{d7}$ = | 64.14 |
| $r_{15}$ | = | ∞ | $d_{15}$ | = | 0.6000 | $n_{d8}$ | = | 1.54771 | $\nu_{d8}$ = | 62.84 |
| $r_{16}$ | = | ∞ | $d_{16}$ | = | 0.4000 | | | | | |
| $r_{17}$ | = | ∞ | $d_{17}$ | = | 0.9000 | $n_{d9}$ | = | 1.54771 | $\nu_{d9}$ = | 62.84 |
| $r_{18}$ | = | ∞ | $d_{18}$ | = | 0.4000 | | | | | |
| $r_{19}$ | = | ∞ | $d_{19}$ | = | 0.7500 | $n_{d10}$ | = | 1.51633 | $\nu_{d10}$ = | 64.14 |
| $r_{20}$ | = | ∞ | $d_{20}$ | = | 1.2098 | | | | | |
| $r_{21}$ | = | ∞ (Image Plane) | | | | | | | | |

Aspherical Coefficients
2nd surface

K = 0
$A_4$ = −6.4687 × 10$^{-4}$
$A_6$ = 7.9816 × 10$^{-6}$
$A_8$ = −2.0304 × 10$^{-6}$
$A_{10}$ = 0.0000

-continued

6th surface

K = 0
$A_4$ = $-9.5187 \times 10^{-4}$
$A_6$ = $-4.3656 \times 10^{-6}$
$A_8$ = $-7.0479 \times 10^{-6}$
$A_{10}$ = 0.0000

| Zooming Data (∞) | WE | ST | TE |
|---|---|---|---|
| f (mm) | 4.52153 | 8.69162 | 12.89380 |
| $F_{NO}$ | 2.6748 | 3.6906 | 4.5245 |
| ω (°) | 33.1 | 18.2 | 12.5 |
| $d_4$ | 14.31868 | 6.27598 | 2.70000 |
| $d_{11}$ | 2.13628 | 8.32101 | 12.75846 |
| $d_{12}$ | 1.40000 | 0.50385 | 0.99490 |

Figure 9A:
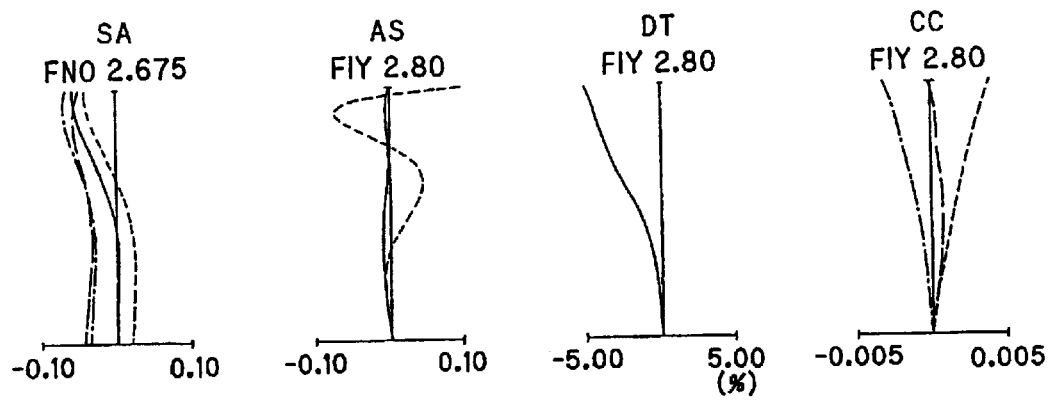
FIGS. 9(*a*), 9(*b*) and 9(*c*) are aberration diagrams for Example 1 upon focused on an object point at infinity.
Figure 9B:
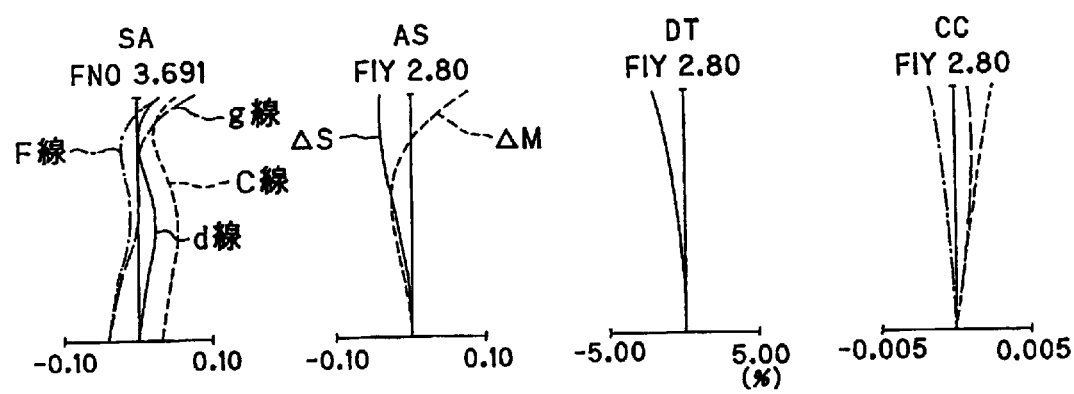
Figure 9C:
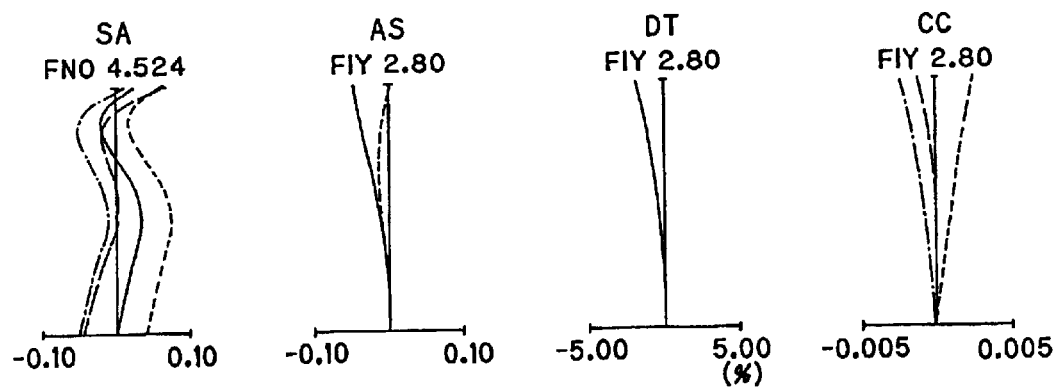
Figure 10A:
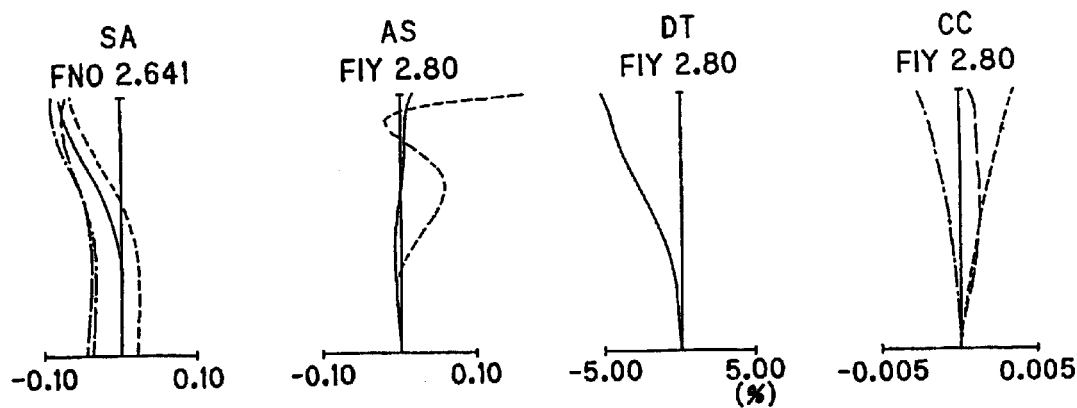
FIGS. 10(*a*), 10(*b*) and 10(*c*) are aberration diagrams for Example 1 upon focused on a subject distance of 10 cm.
Figure 10B:
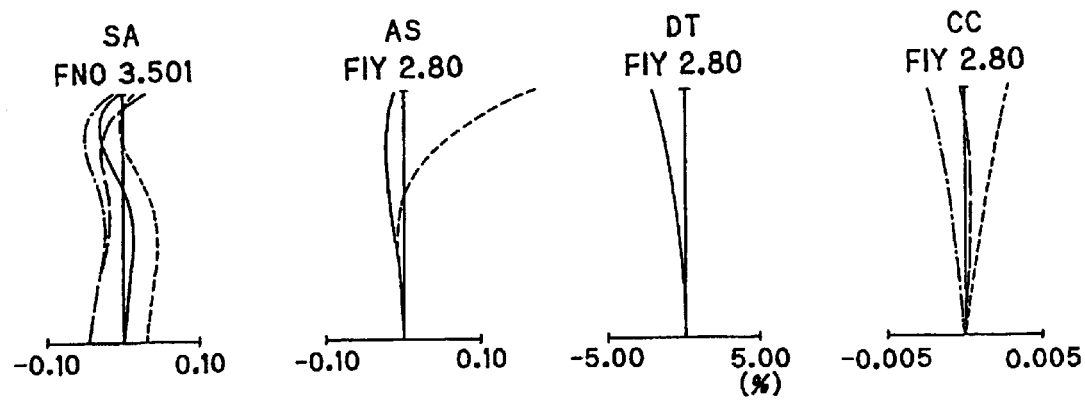
Figure 10C:
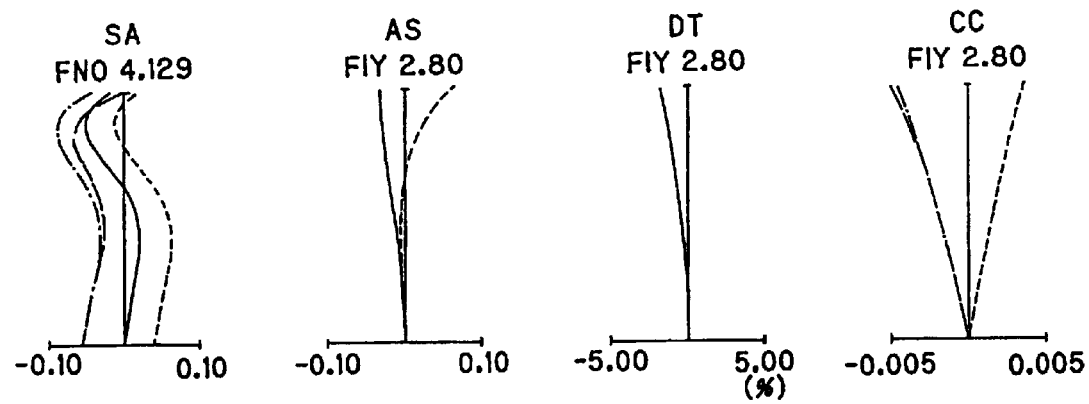
Figure 11A:
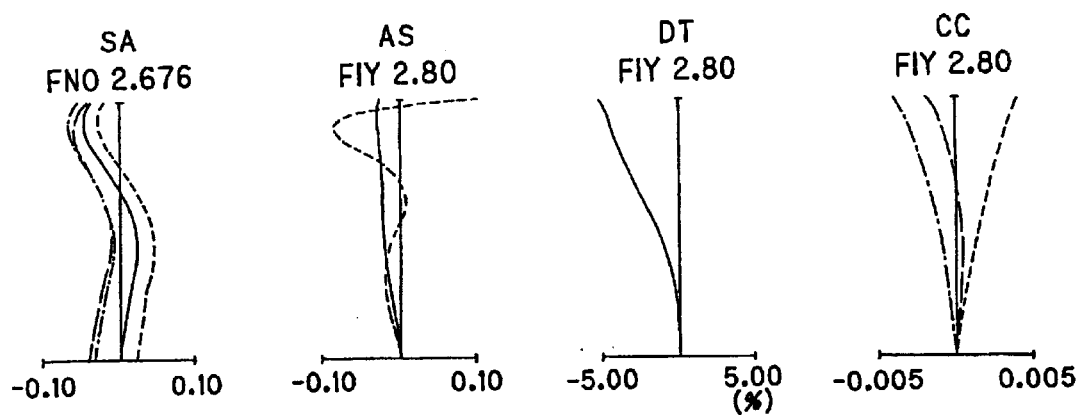
FIGS. 11(*a*), 11(*b*) and 11(*c*) are aberration diagrams for Example 2 upon focused on an object point at infinity.
Figure 11B:
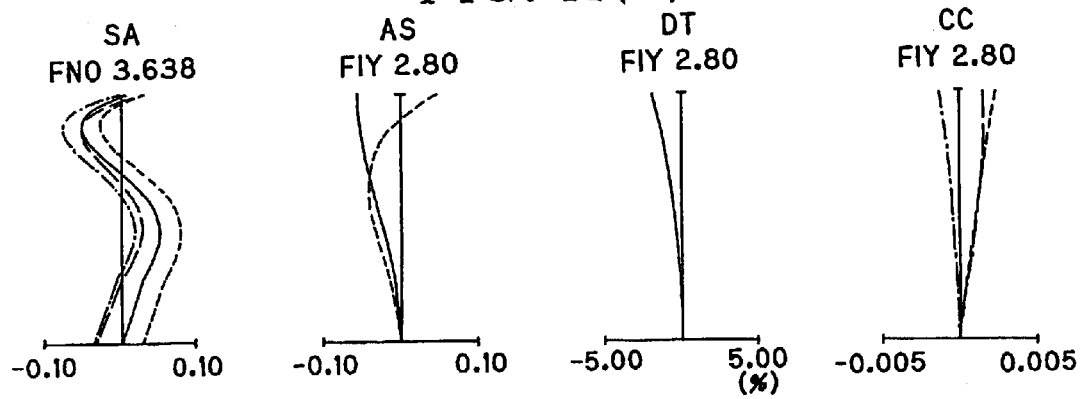
Figure 11C:
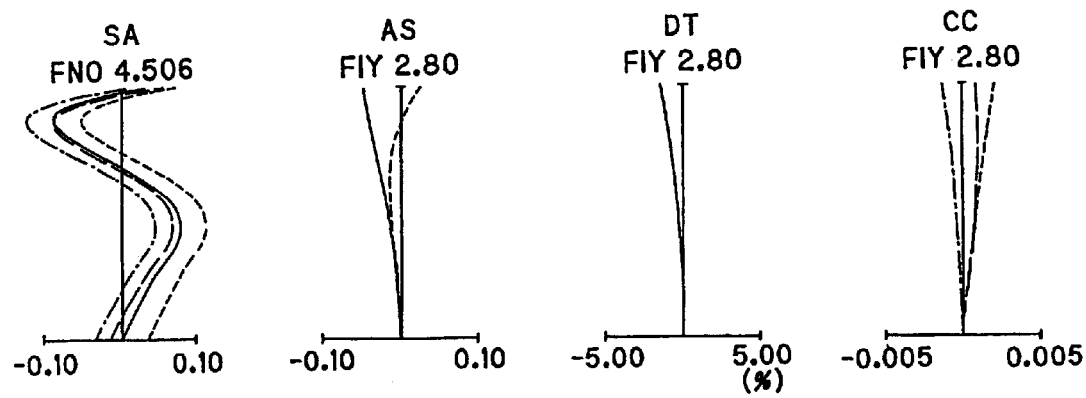
Figure 12A:
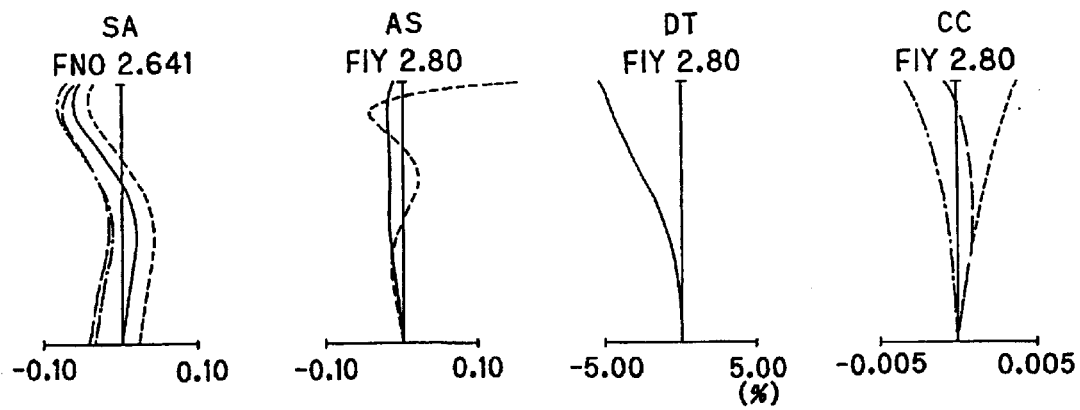
FIGS. 12(*a*), 12(*b*) and 12(*c*) are aberration diagrams for Example 2 upon focused on a subject distance of 10 cm.
Figure 12B:
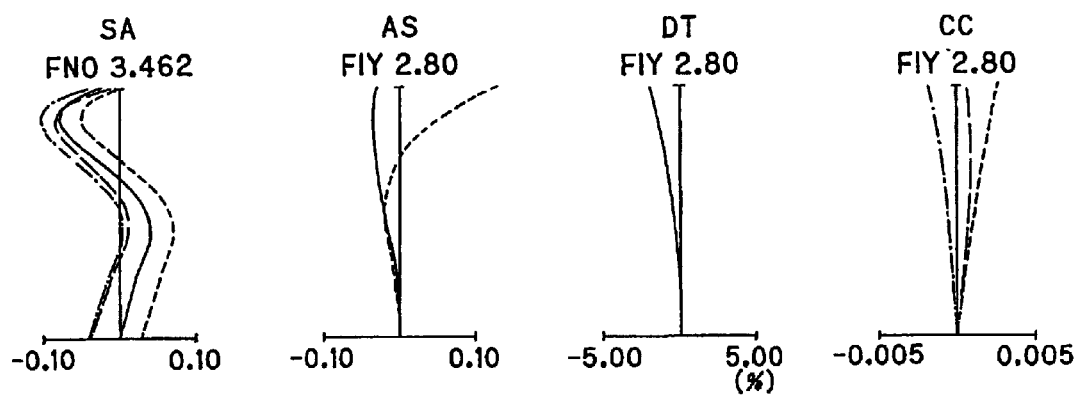
Figure 12C:
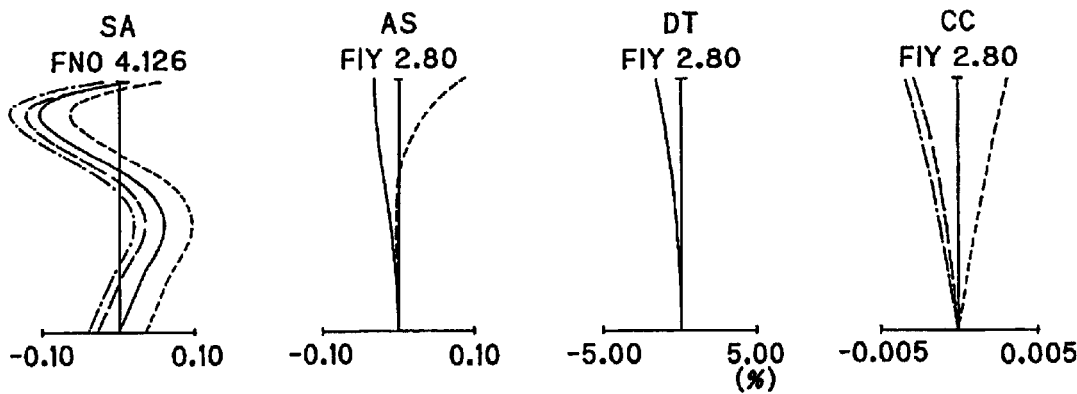
Figure 13A:
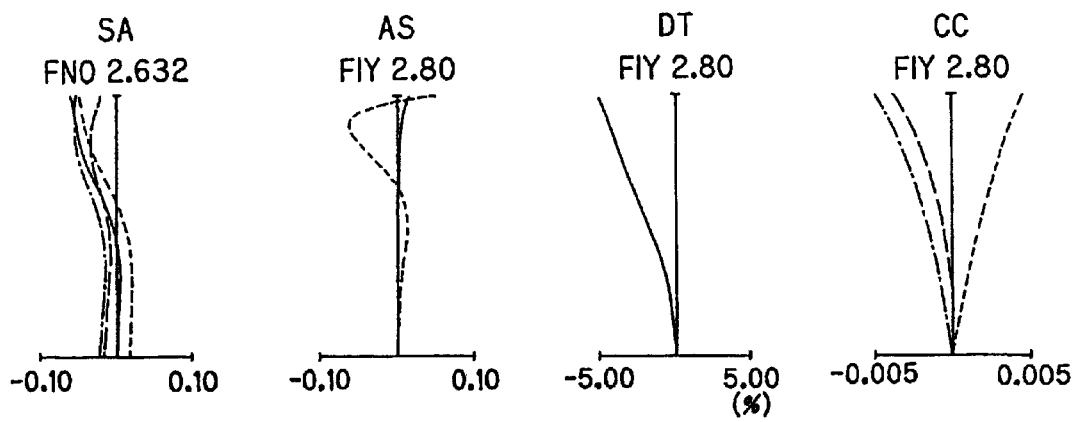
FIGS. 13(*a*), 13(*b*) and 13(*c*) are aberration diagrams for Example 6 upon focused on an object point at infinity.
Figure 13B:
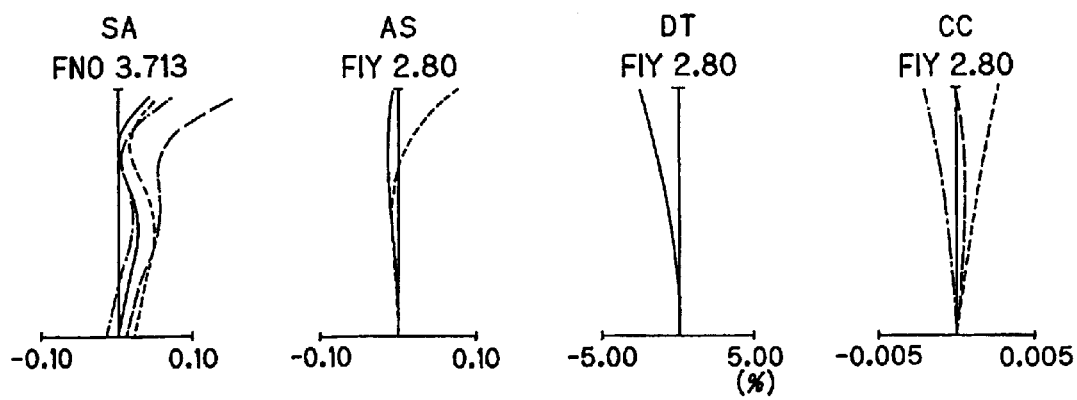
Figure 13C:
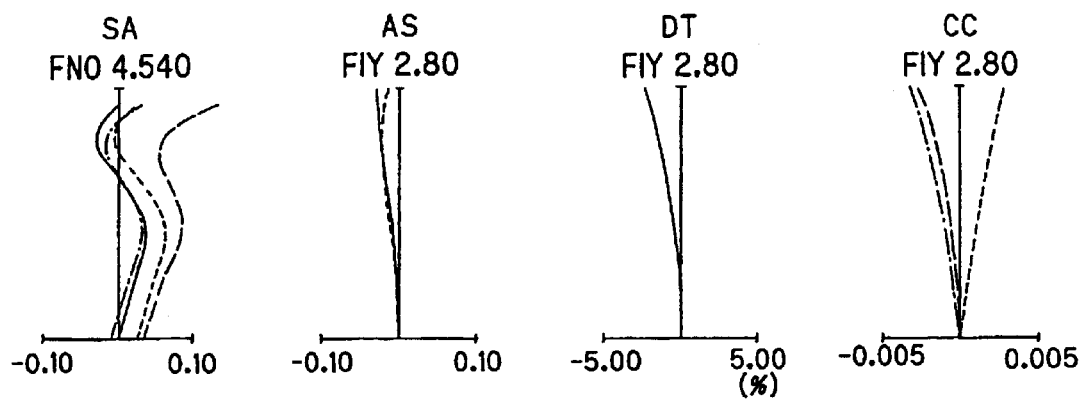
Figure 14A:
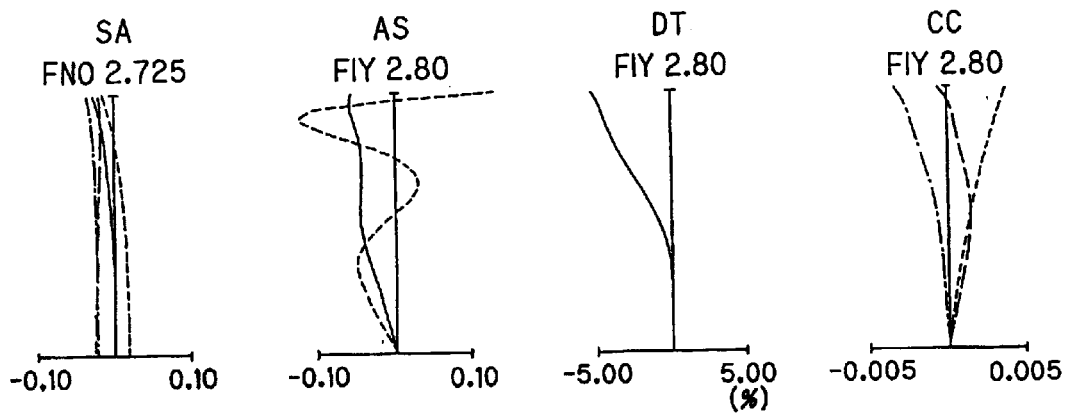
FIGS. 14(*a*), 14(*b*) and 14(*c*) are aberration diagrams for Example 7 upon focused on an object point at infinity.
Figure 14B:
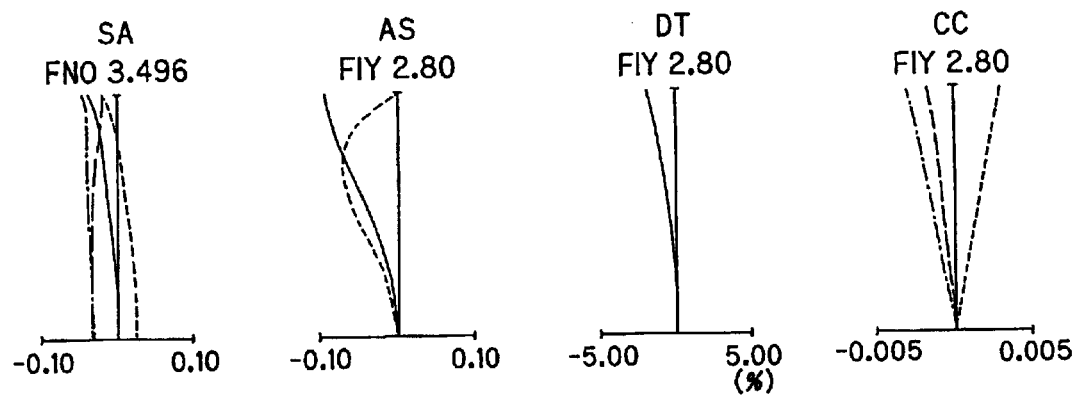
Figure 14C:
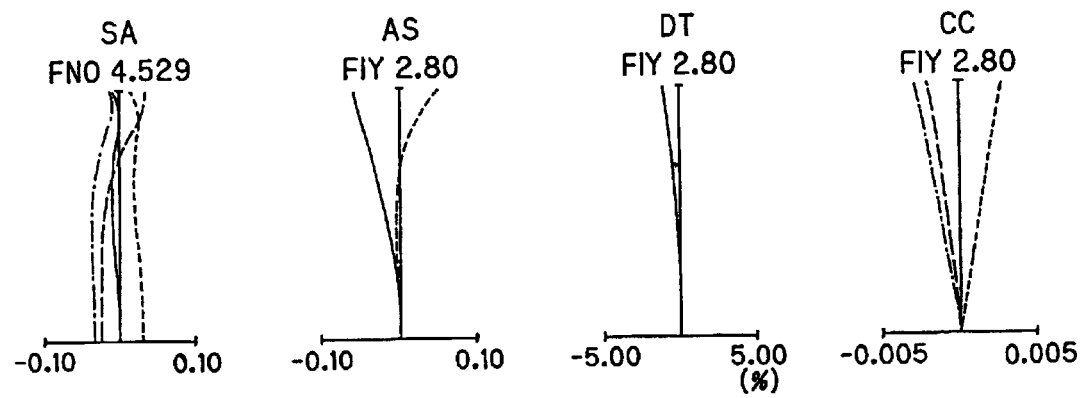

FIGS. 9 and 10 are aberration diagrams for Example 1 upon focused on an infinite object point and at a subject distance of 10 cm. FIGS. 11 and 12 are aberration diagrams for Example 2 upon focused on an infinite object point and at a subject distance of 10 cm. FIGS. 13 and 14 are aberration diagrams for Examples 6 and 7 upon focused on an infinite object point. In these figures, (a), (b) and (c) show spherical aberrations SA, astigmatism AS, distortion DT and chromatic aberration of magnification CC at the wide-angle end, in an intermediate state and at the telephoto end, respectively. "FIY" stands for an image height.

Tabulated below are the values of conditions (1) through (19) as well as the values of Asp2R and L with respect to condition (a).

| Example | 1 | 2 | 3 | 4 | 5 |
|---|---|---|---|---|---|
| (1) | 0.58608 | 0.22788 | 0.37959 | -0.05540 | 0.02436 |
| (2) | 25.56000 | 25.56000 | 25.56000 | 25.56000 | 25.56000 |
| (3) | -4.07334 | -4.13035 | -3.66616 | -4.78850 | -4.50804 |
| (4) (8) | 0.97778 | 1.13333 | 1.02222 | 1.13333 | 1.13333 |
| (5) (9) | 0.00219 | -0.57882 | -0.30641 | -0.85511 | -0.87953 |
| (6) | 0.15909 | — | 0.10870 | — | — |
| (7) | 23.78000 | 23.78000 | 26.52000 | 26.52000 | 26.52000 |
| (10) | — | 17.14000 | — | 12.72000 | 12.72000 |
| (11) | 0.84663 | 0.81781 | 0.84290 | 0.82050 | 0.81963 |
| (12) | 0.71766 | 0.93118 | 0.71817 | 0.94944 | 0.95242 |
| (13) | 0.99836 | 0.94365 | 0.99479 | 0.95636 | 0.96038 |
| (14) | 0.04056 | 0.04056 | 0.01862 | 0.01862 | 0.01862 |
| (15) | 1.0 | 1.0 | 1.0 | 1.0 | 1.0 |
| (16) | 0.04 | 0.04 | 0.04 | 0.04 | 0.04 |
| (17) | 0.0 | 0.0 | 0.0 | 0.0 | 0.0 |
| (18) | 1.06 | 1.06 | 1.06 | 1.06 | 1.06 |
| (19) | 0.333 | 0.333 | 0.333 | 0.333 | 0.333 |
|  | (a = 3.0) | (a = 3.0) | (a = 3.0) | (a = 3.0) | (a = 3.0) |
| Asp2R | 0 | 0 | 0 | 0 | 0 |
| L | 5.6 | 5.6 | 5.6 | 5.6 | 5.6 |

| Example | 6 | 7 | 8 |
|---|---|---|---|
| (1) | 0.88985 | -0.18625 | 0.58608 |
| (2) | 25.56000 | 25.56000 | 25.56000 |
| (3) | -3.63229 | -2.96825 | -4.07334 |
| (4) (8) | 0.95833 | 1.15000 | 0.97778 |
| (5) (9) | -0.41686 | 0.04275 | 0.00219 |
| (6) | 0.10870 | 0.10870 | 0.15909 |
| (7) | 26.52000 | 25.68000 | 23.78000 |
| (10) | — | — | — |
| (11) | 0.81814 | 0.89827 | 0.84663 |
| (12) | 0.70396 | 0.71425 | 0.71766 |
| (13) | 0.99221 | 1.03382 | 0.99836 |
| (14) | 0.01862 | 0.04153 | 0.04056 |
| (15) | 1.0 | 1.0 | 1.0 |
| (16) | 0.04 | 0.04 | 0.04 |
| (17) | 0.0 | 0.0 | 0.0 |
| (18) | 1.06 | 1.06 | 1.06 |
| (19) | 0.333 | 0.333 | 0.3 |
|  | (a = 3.0) | (a = 3.0) | (a = 2.0) |
| Asp2R | 0 | 0 | 0 |
| L | 5.6 | 5.6 | 5.6 |

It is noted that in Examples 1 to 7, the low-pass filter LF has a total thickness of 1.500 mm and a triple-layer structure. It is also appreciated that many modifications may be made to the aforesaid examples without departing from the scope of the invention. For instance, the low-pass filter LF may be formed of one single low-pass filter element.

Figure 15:
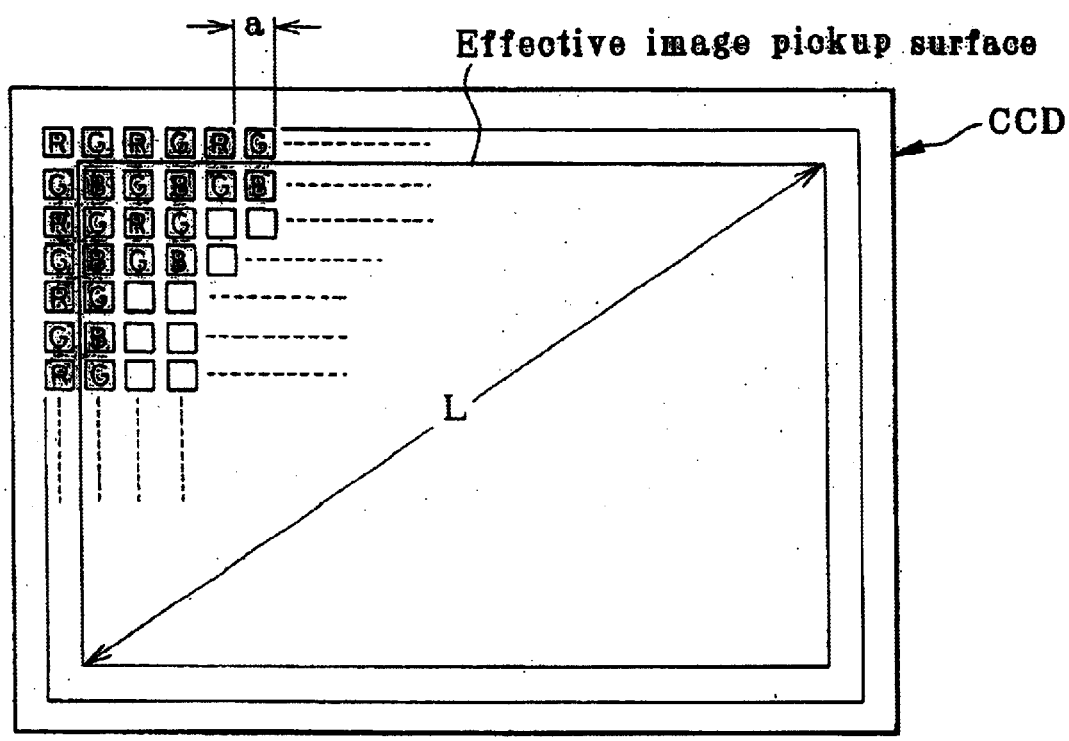
FIG. 15 is illustrative of the diagonal length of the effective image pickup plane of an electronic image pickup device upon phototaking.
Figure 16:
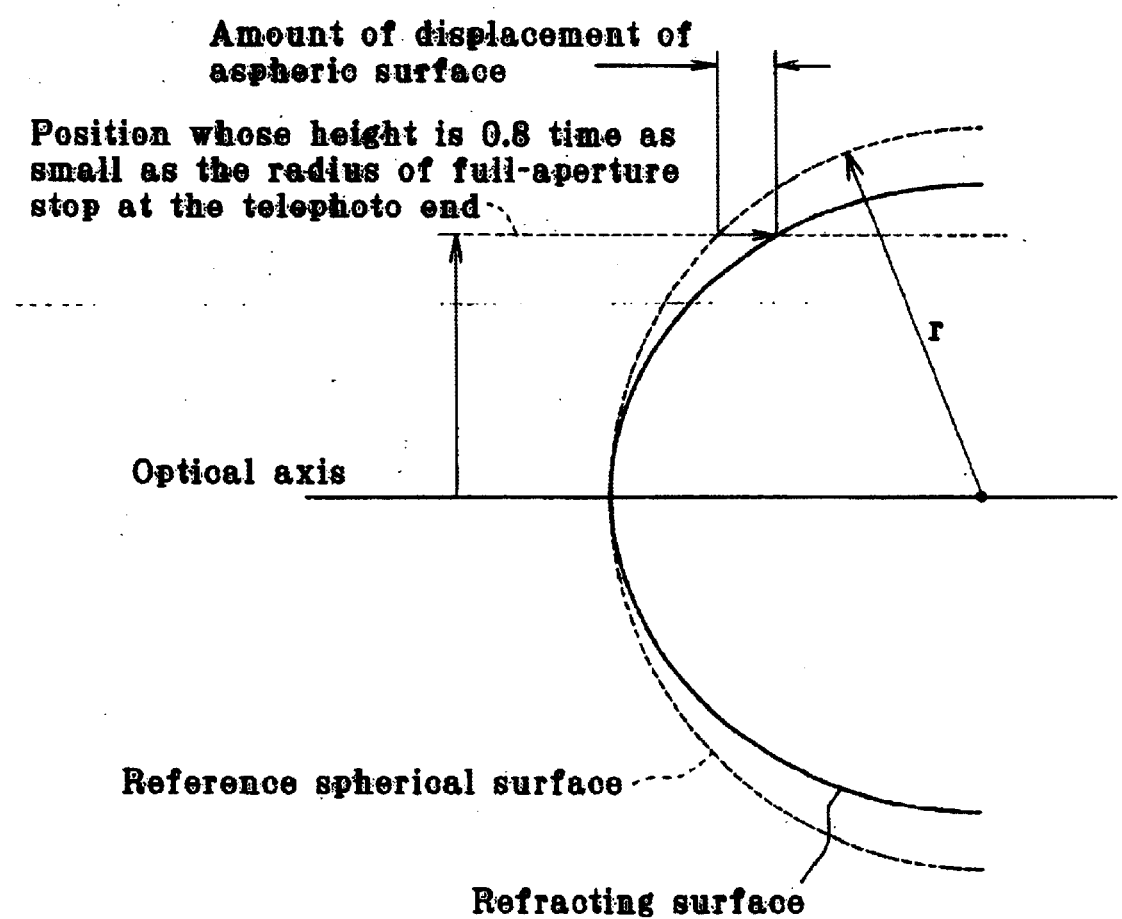
FIG. 16 is illustrative of the definition of the amount of displacement of an aspheric surface according to the invention.

Here the diagonal length L of the effective image pickup plane and the pixel spacing a are explained. FIG. 15 is illustrative of one exemplary pixel array of an image pickup device, wherein R (red), G (green) and B (blue) pixels or four cyan, magenta, yellow and green (G) pixels are mosaically arranged at the pixel spacing a. The "effective image pickup plane" used herein is understood to mean a certain area in the photoelectric conversion surface on an image pickup device used for the reproduction of a phototaken image (on a personal computer or by a printer). The effective image pickup plane shown in FIG. 8 is set at an area narrower than the total photoelectric conversion surface on the image pickup device, depending on the performance of the optical system used (an image circle that can be ensured by the performance of the optical system). Thus, the diagonal length L of an effective image pickup plane is defined by that of the effective image pickup plane. Although the image pickup range used for image reproduction may be variable, it is noted that when the zoom lens of the invention is used on an image pickup system having such functions, the diagonal length L of its effective image pickup plane varies. In that case, the diagonal length L of the effective image pickup plane according to the invention is defined by the maximum value in the widest possible range for L.

The infrared cut means includes an infrared cut absorption filer IF and an infrared sharp cut coat. The infrared cut absorption filter IF is formed of a glass having an infrared absorber therein, and the infrared sharp cut coat cuts infrared rays by reflection rather than by absorption. Instead of this infrared cut absorption filter IF, it is thus acceptable to use a low-pass filter LF or dummy transparent plane plate with an infrared sharp cut coat applied directly thereon.

Preferable in this case, the near-infrared sharp cut coat is designed to have a transmittance of at least 80% at 600 nm wavelength and a transmittance of up to 10% at 700 nm wavelength. More specifically, the near-infrared sharp cut coat has a multilayer structure made up of such 27 layers as mentioned below; however, the design wavelength is 780 nm.

| Substrate | Material | Physical Thickness (nm) | λ/4 |
|---|---|---|---|
| 1st layer | Al$_2$O$_3$ | 58.96 | 0.50 |
| 2nd layer | TiO$_2$ | 84.19 | 1.00 |
| 3rd layer | SiO$_2$ | 134.14 | 1.00 |
| 4th layer | TiO$_2$ | 84.19 | 1.00 |
| 5th layer | SiO$_2$ | 134.14 | 1.00 |
| 6th layer | TiO$_2$ | 84.19 | 1.00 |
| 7th layer | SiO$_2$ | 134.14 | 1.00 |
| 8th layer | TiO$_2$ | 84.19 | 1.00 |
| 9th layer | SiO$_2$ | 134.14 | 1.00 |
| 10th layer | TiO$_2$ | 84.19 | 1.00 |
| 11th layer | SiO$_2$ | 134.14 | 1.00 |
| 12th layer | TiO$_2$ | 84.19 | 1.00 |
| 13th layer | SiO$_2$ | 134.14 | 1.00 |
| 14th layer | TiO$_2$ | 84.19 | 1.00 |
| 15th layer | SiO$_2$ | 178.41 | 1.33 |
| 16th layer | TiO$_2$ | 101.03 | 1.21 |
| 17th layer | SiO$_2$ | 167.67 | 1.25 |
| 18th layer | TiO$_2$ | 96.82 | 1.15 |
| 19th layer | SiO$_2$ | 147.55 | 1.05 |
| 20th layer | TiO$_2$ | 84.19 | 1.00 |
| 21st layer | SiO$_2$ | 160.97 | 1.20 |
| 22nd layer | TiO$_2$ | 84.19 | 1.00 |
| 23rd layer | SiO$_2$ | 154.26 | 1.15 |
| 24th layer | TiO$_2$ | 95.13 | 1.13 |
| 25th layer | SiO$_2$ | 160.97 | 1.20 |
| 26th layer | TiO$_2$ | 99.34 | 1.18 |
| 27th layer | SiO$_2$ | 87.19 | 0.65 |
| Air | | | |

Figure 17:
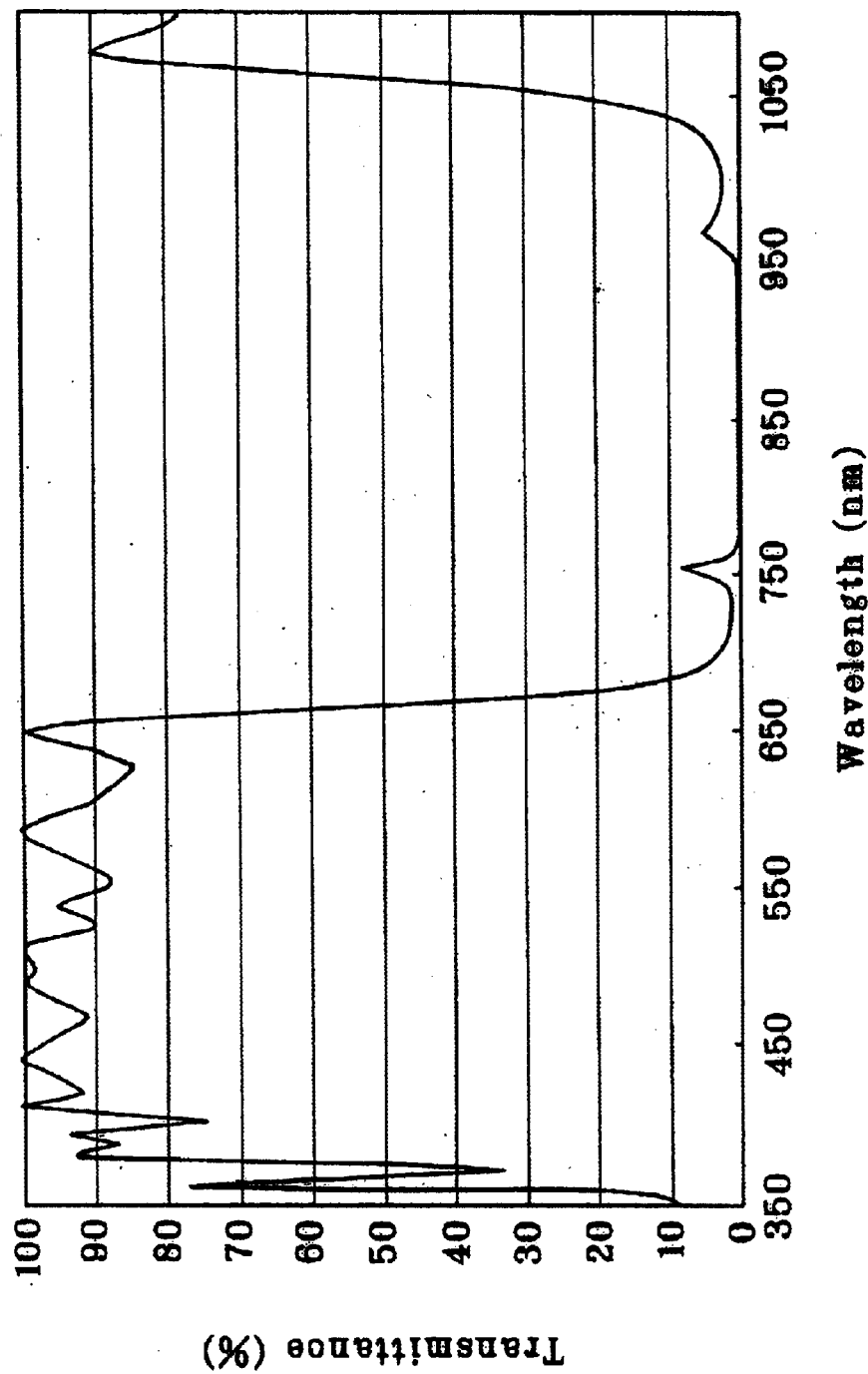
FIG. 17 is a diagram indicative of the transmittance characteristics of one example of the near-infrared sharp cut coat.

The aforesaid near-infrared sharp cut coat has such transmittance characteristics as shown in FIG. 17.

Figure 18:
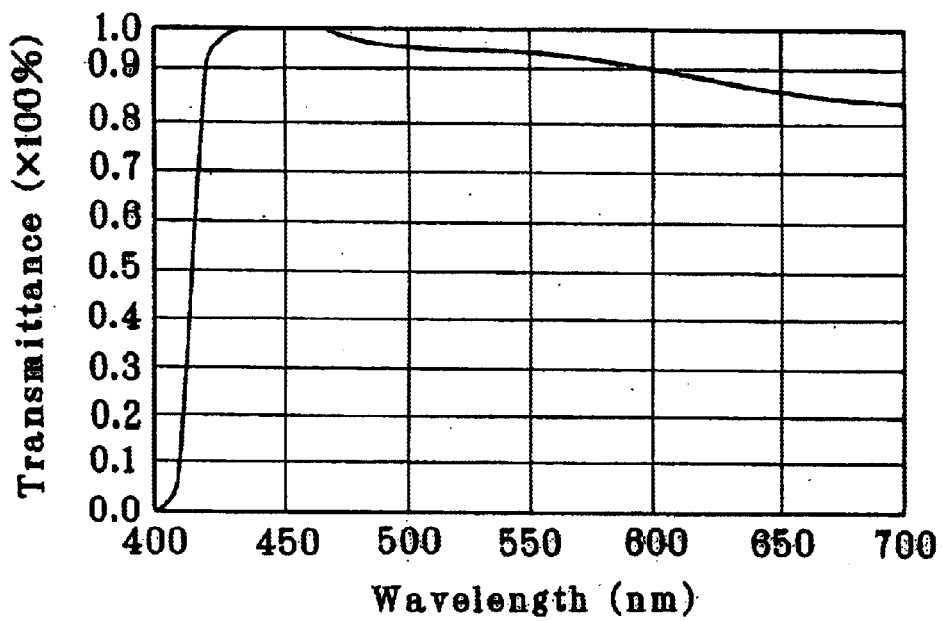
FIG. 18 is a diagram indicative of the transmittance characteristics of one example of the color filter located on the exit surface side of the low-pass filter.

The low-pass filter LF is provided on its exit surface side with a color filter or coat for reducing the transmission of colors at such a short wavelength region as shown in FIG. 18, thereby further enhancing the color reproducibility of an electronic image.

Preferably, that filter or coat should be designed such that the ratio of the transmittance of 420 nm wavelength with respect to the transmittance of a wavelength in the range of 400 nm to 700 nm at which the highest transmittance is found is at least 15% and that the ratio of 400 nm wavelength with respect to the highest wavelength transmittance is up to 6%.

It is thus possible to reduce a discernible difference between the colors perceived by the human eyes and the colors of the image to be picked up and reproduced. In other words, it is possible to prevent degradation in images due to the fact that a color of short wavelength less likely to be perceived through the human sense of sight can be readily seen by the human eyes.

When the ratio of the 400 nm wavelength transmittance is greater than 6%, the short wavelength region less likely to be perceived by the human eyes would be reproduced with perceivable wavelengths. Conversely, when the ratio of the 420 nm wavelength transmittance is less than 15%, a wavelength region perceivable by the human eyes is less likely to be reproduced, putting colors in an ill-balanced state.

Such means for limiting wavelengths can be more effective for imaging systems using a complementary colors mosaic filter.

In each of the aforesaid examples, coating is applied in such a way that, as shown in FIG. 18, the transmittance for 400 nm wavelength is 0%, the transmittance for 420 nm is 90%, and the transmittance for 440 nm peaks or reaches 100%.

With the synergistic action of the aforesaid near-infrared sharp cut coat and that coating, the transmittance for 400 nm is set at 0%, the transmittance for 420 nm at 80%, the transmittance for 600 nm at 82%, and the transmittance for 700 nm at 2% with the transmittance for 450 nm wavelength peaking at 99%, thereby ensuring more faithful color reproduction.

The low-pass filter LF is made up of three different filter elements stacked one upon another in the optical axis direction, each filter element having crystallographic axes in directions where, upon projected onto the image plane, the azimuth angle is horizontal (=0°) and ±45° therefrom. Three such filter elements are mutually displaced by a μm in the horizontal direction and by SQRT(½)×a in the ±45° direction for the purpose of moiré control, wherein SQRT means a square root.

Figure 19:
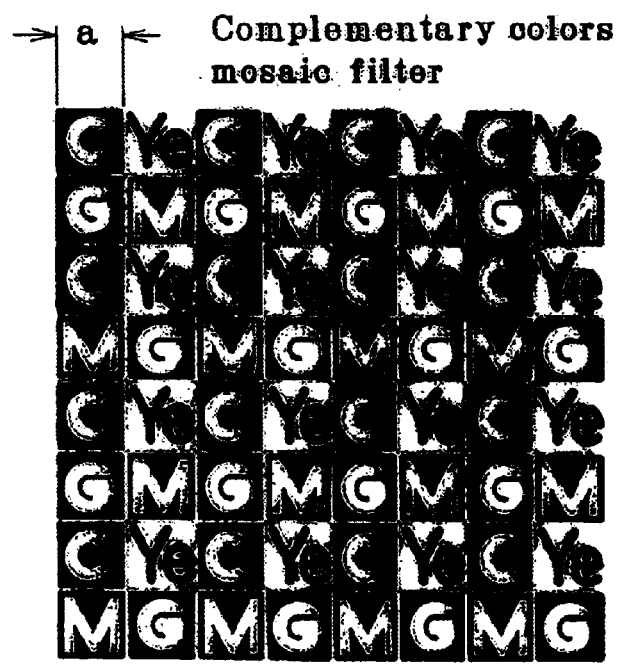
FIG. 19 is a schematic illustrative of how the color filter elements are arranged in the complementary colors filter.

The image pickup plane I of a CCD is provided thereon with a complementary mosaic filter wherein, as shown in FIG. 19, color filter elements of four colors, cyan, magenta, yellow and green are arranged in a mosaic fashion corresponding to image pickup pixels. More specifically, these four different color filter elements, used in almost equal numbers, are arranged in such a mosaic fashion that neighboring pixels do not correspond to the same type of color filter elements, thereby ensuring more faithful color reproduction.

To be more specific, the complementary colors mosaic filter is composed of at least four different color filter elements as shown in FIG. 19, which should preferably have such characteristics as given below.

Each green color filter element G has a spectral strength peak at a wavelength $G_p$, each yellow filter element $Y_e$ has a spectral strength peak at a wavelength $Y_p$, each cyan filter element C has a spectral strength peak at a wavelength $C_p$, and each magenta filter element M has spectral strength peaks at wavelengths $M_{P1}$ and $M_{P2}$, and these wavelengths satisfy the following conditions.

$$510 \text{ nm} < G_p < 540 \text{ nm}$$

$$5 \text{ nm} < Y_p - G_p < 35 \text{ nm}$$

$$-100 \text{ nm} < C_p - G_p < -5 \text{ nm}$$

$$430 \text{ nm} < M_{P1} < 480 \text{ nm}$$

$$580 \text{ nm} < M_{P2} < 640 \text{ nm}$$

To ensure higher color reproducibility, it is preferred that the green, yellow and cyan filter elements have a strength of at least 80% at 530 nm wavelength with respect to their respective spectral strength peaks, and the magenta filter elements have a strength of 10% to 50% at 530 nm wavelength with their spectral strength peak.

Figure 20:
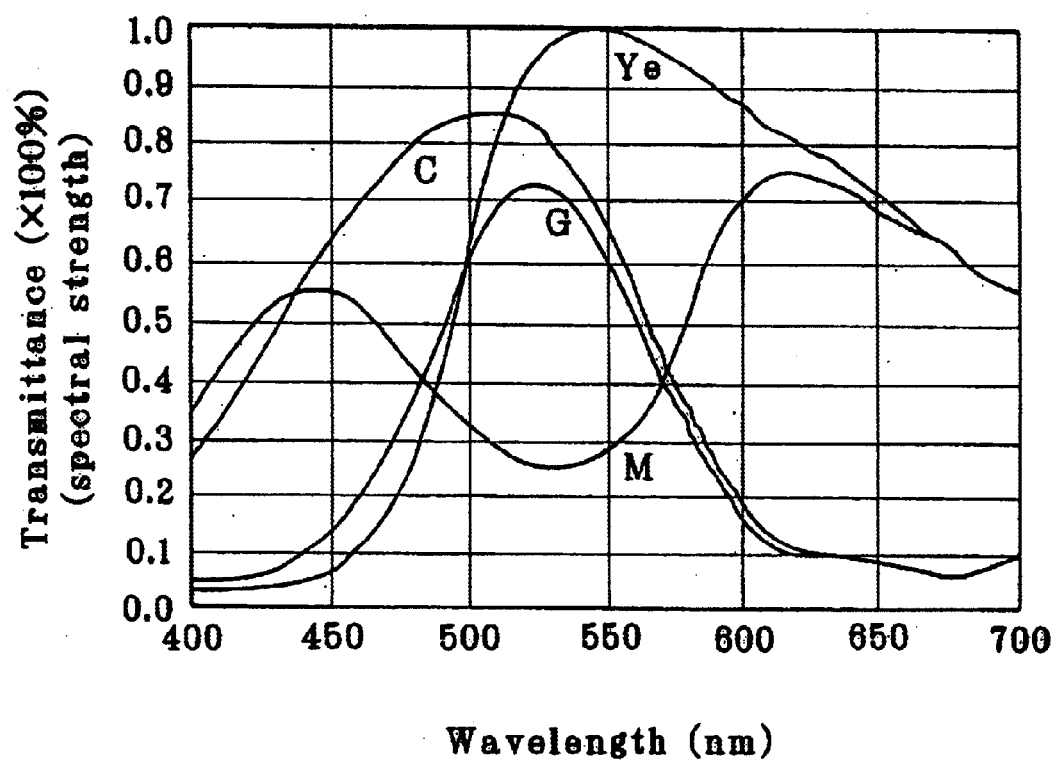
FIG. 20 is a diagram indicative of one example of the wavelength characteristics of the complementary colors mosaic filter.

One example of the wavelength characteristics in the aforesaid respective examples is shown in FIG. 20. The green filter element G has a spectral strength peak at 525 nm.

The yellow filter element $Y_e$ has a spectral strength peak at 555 nm. The cyan filter element C has a spectral strength peak at 510 nm. The magenta filter element M has peaks at 445 nm and 620 nm. At 530 nm, the respective color filter elements have, with respect to their respective spectral strength peaks, strengths of 99% for G, 95% for $Y_e$, 97% for C and 38% for M.

For such a complementary colors filter, such signal processing as mentioned below is electrically carried out by means of a controller (not shown) (or a controller used with digital cameras).

For luminance signals, $$Y = |G + M + Y_e + C| \times \frac{1}{4}$$

For chromatic signals, $$R - Y = |(M + Y_e) - (G + C)|$$

$$B - Y = |(M + C) - (G + Y_e)|$$

Through this signal processing, the signals from the complementary colors filter are converted into R (red), G (green) and B (blue) signals.

In this regard, it is noted that the aforesaid near-infrared sharp cut coat may be located anywhere on the optical path, and that the number of low-pass filters LF may be either two as mentioned above or one.

The electronic image pickup system constructed as described above may be applied to phototaking systems where object images formed through zoom lenses are received at image pickup devices such as CCDs, inter alia, digital cameras or video cameras as well as PCs and telephone sets which are typical information processors, in particular, easy-to-carry cellular phones. A specific embodiment is now given.

Figure 21:
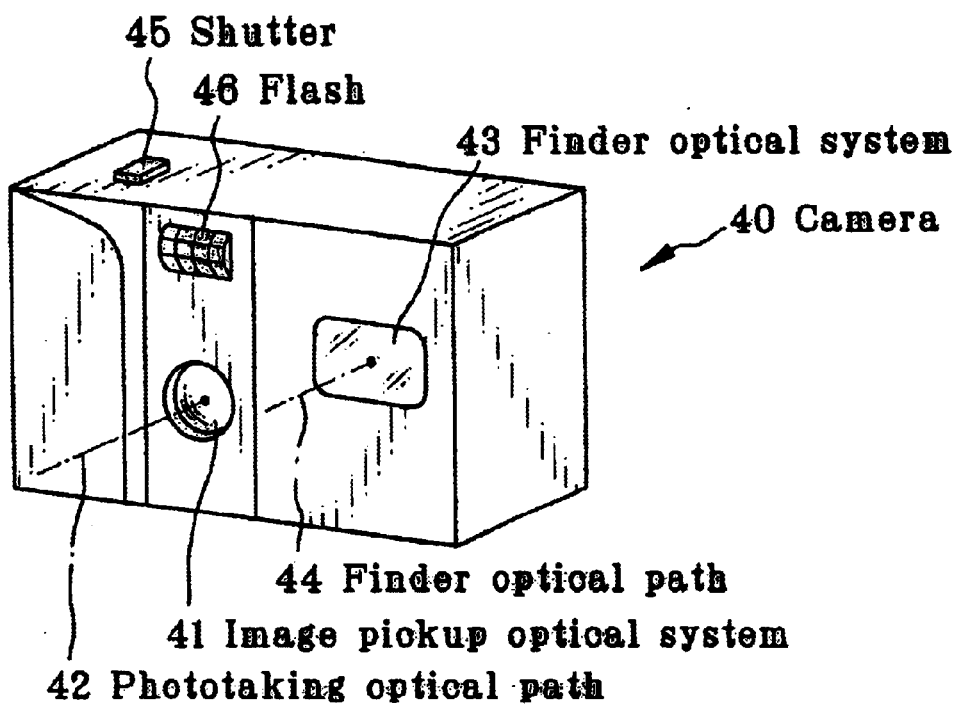
FIG. 21 is a front perspective schematic illustrative of the outside shape of a digital camera with the inventive zoom lens built therein.
Figure 22:
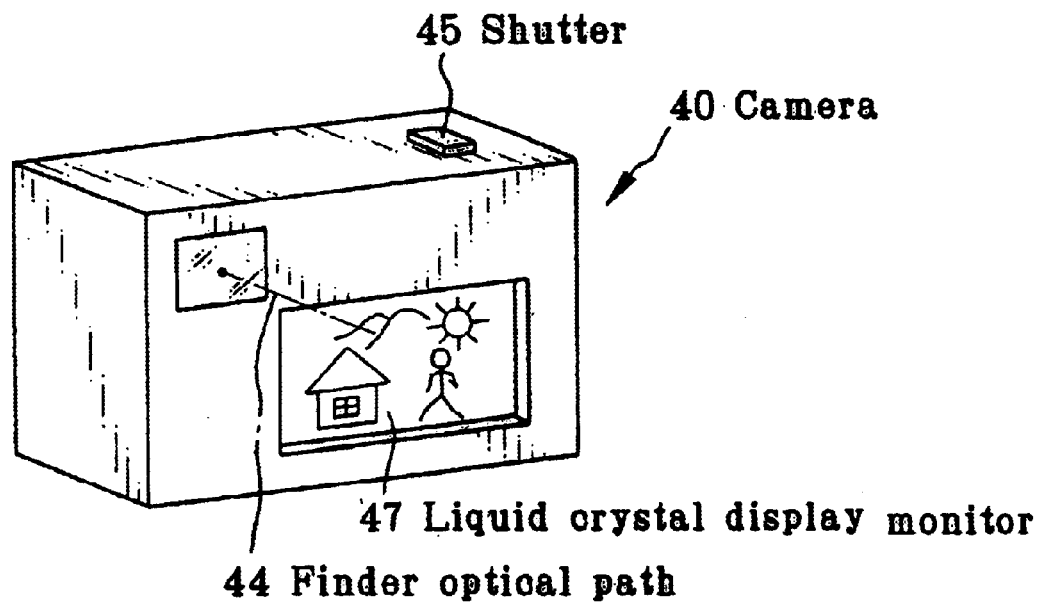
FIG. 22 is a rear perspective schematic of the digital camera of FIG. 21.
Figure 23:
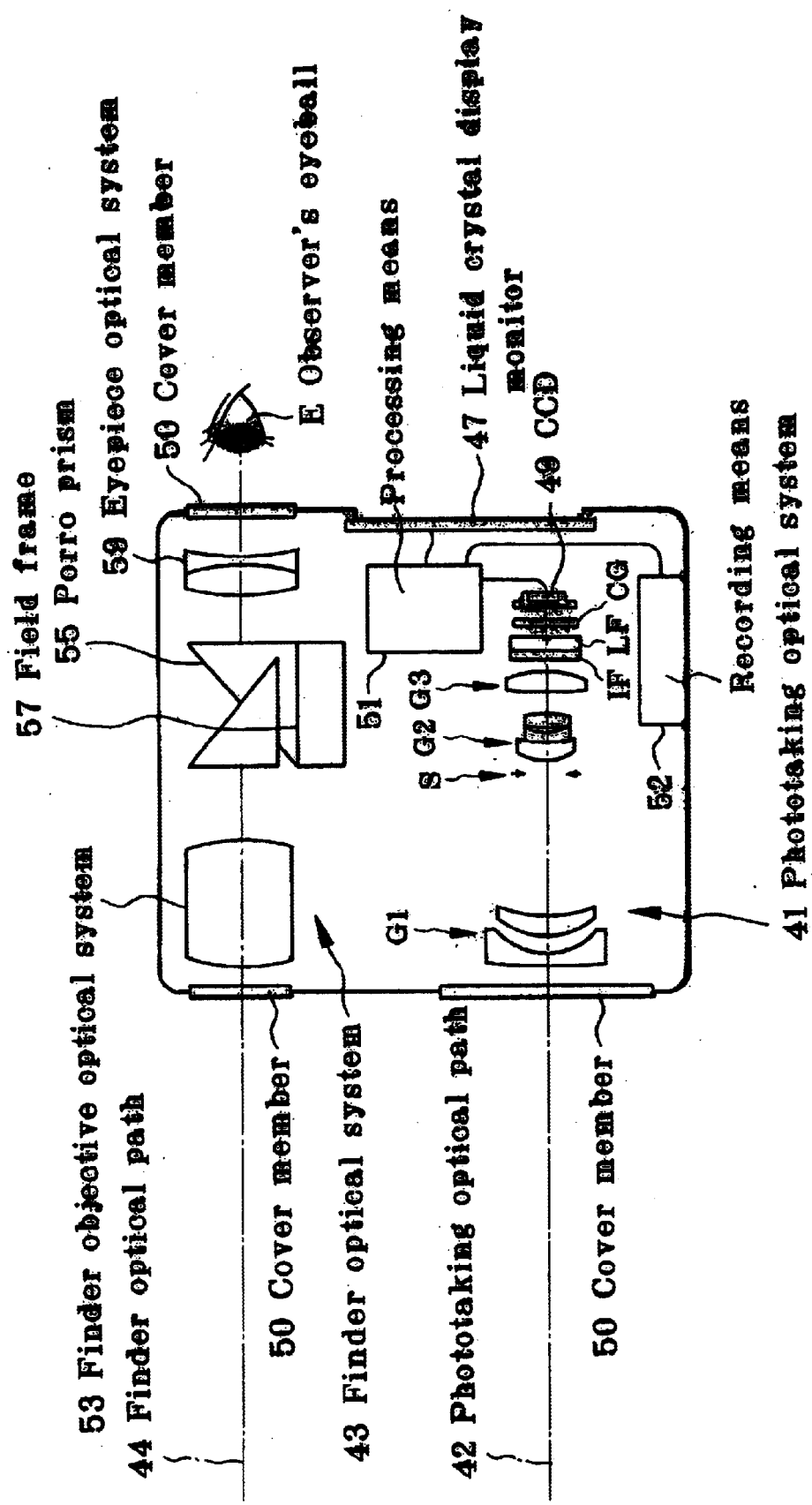
FIG. 23 is a sectional schematic of the digital camera of FIG. 21.

FIGS. 21, 22 and 23 are conceptual illustrations of a phototaking optical system 41 for digital cameras, in which the zoom lens of the present invention is incorporated. FIG. 21 is a front perspective view of the outside shape of a digital camera 40, and FIG. 22 is a rear perspective view of the same. FIG. 23 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal monitor 47 and so on. As the shutter 45 mounted on the upper portion of the camera 40 is pressed down, phototaking takes place through the phototaking optical system 41, for instance, the zoom lens according to Example 1. An object image formed by the phototaking optical system 41 is formed on the image pickup plane of a CCD 49 via an infrared cut absorption filter IF comprising a dummy transparent plane plate provided thereon with a near-infrared cut coat and an optical low-pass filter LF. The object image received at CCD 49 is shown as an electronic image on the liquid crystal monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver-halide camera using a silver-halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and cost reductions, because the phototaking optical system 41 is constructed of a fast zoom lens having a high zoom ratio at the wide-angle end with satisfactory aberrations and a back focus large enough to receive a filter, etc. therein.

In the embodiment of FIG. 23, plane-parallel plates are used as the cover members 50; however, it is acceptable to use powered lenses.

As can be appreciated from the foregoing explanation, the present invention can provide a zoom lens that is received in a collapsible lens mount with smaller thickness and efficiency, has high magnifications and is excellent in image-formation capability even on rear focusing, and enables video cameras or digital cameras to be thoroughly slimmed down.

I claim:

1. A zoom lens comprising, in order from an object side thereof, a first lens group having negative refracting power, a second lens group having positive refracting power and a third lens group having positive refracting power, wherein:

for zooming from a wide-angle end to a telephoto end of the zoom lens upon focused on an infinite object point, the second lens group moves toward the object side alone and the third lens group moves with a varying spacing with the second lens group, the second lens group comprises, in order from an object side thereof, a front subgroup and a rear subgroup with a space interposed therebetween, wherein the front subgroup consists of a doublet component consisting of, in order from an object side thereof, a positive lens element having an aspheric surface and a negative lens element, and the rear subgroup consists of one positive lens component, and the zoom lens satisfies condition (1) with respect to the third lens group:

$$-0.6 < (R_{3F} + R_{3R})/(R_{3F} - R_{3R}) < 1.2 \tag{1}$$

where $R_{3F}$ is an axial radius of curvature of an surface of the third lens group located nearest to an object side thereof and $R_{3R}$ is an axial radius of curvature of a surface of the third lens group located nearest to an image side thereof.

2. The zoom lens according to claim 1, wherein the first lens group consists of two lens elements, i.e., a negative lens element having an aspheric surface and a positive lens element, and satisfies conditions (2) and (3):

$$20 < v_{11} - v_{12} \tag{2}$$

$$-10 < (R_{13} + R_{14})/(R_{13} - R_{14}) < -1.5 \tag{3}$$

where $v_{11}$ is a d-line based Abbe number of the negative lens element in the first lens group, $v_{12}$ is a d-line based Abbe number of the positive lens element in the first lens group, and $R_{13}$ and $R_{14}$ are axial radii of curvature of an object side-surface and an image side-surface of the positive lens element in the first lens group, respectively.

3. The zoom lens according to claim 2, wherein the rear subgroup of the second lens group consists of a single lens component having positive refracting power and satisfies condition (4):

$$0.7 < t_2/t_1 < 1.3 \quad (4)$$

where $t_1$ is an axial thickness of the first lens group from a surface located nearest to an object side thereof to a surface located nearest to an image side thereof, and $t_2$ is an axial thickness of the second lens group from a surface located nearest to an object side thereof to a surface located nearest to an image side thereof.

4. The zoom lens according to claim 1, wherein the rear subgroup of the second lens group consists of a single lens component having positive refracting power and satisfies conditions (5), (6) and (7):

$$-1.0 < (R_{2RF} + R_{2RR})/(R_{2RF} - R_{2RR}) < 0.5 \quad (5)$$

$$0.04 < t_{2N}/t_2 < 0.2 \quad (6)$$

$$v_{22} < 26.5 \quad (7)$$

where $R_{2RF}$ is an axial radius of curvature of a surface located nearest to an object side of the rear subgroup of the second lens group, $R_{2RR}$ is an axial radius of curvature of a surface located nearest to an image side of the rear subgroup of the second lens group, $t_{2N}$ is an axial thickness of the front subgroup of the second lens group from an object side-cementing surface thereof to an image plane side-surface thereof, $t_2$ is an axial thickness of the second lens group from a surface nearest to an object side thereof to a surface located nearest to an image side thereof, and $v_{22}$ is a d-line based Abbe number of the negative lens element in the front subgroup of the second lens group.

5. The zoom lens according to claim 1, wherein the rear subgroup of the second lens group is composed of a cemented lens component consisting of, in order from an object side thereof, a negative lens element and a positive lens element, and satisfies condition (8):

$$0.8 < t_2/t_1 < 1.5 \quad (8)$$

where $t_1$ is an axial thickness of the first lens group from a surface located nearest to an object side thereof to a surface located nearest to an image side thereof, and $t_2$ is an axial thickness of the second lens group from a surface located nearest to an object side thereof to a surface located nearest to an image side thereof.

6. The zoom lens according to claim 1, wherein the rear subgroup of the second lens group is composed of a cemented lens component consisting of, in order from an object side thereof, a negative lens element and a positive lens element, and satisfies conditions (9) and (10):

$$-1.5 < (R_{2RF} + R_{2RR})/(R_{2RF} - R_{2RR}) < 0 \quad (9)$$

$$0 < v_{2RN} - v_{22} < 35 \text{ wherein } v_{22} \geq 26.5 \quad (10)$$

where $R_{2RF}$ is an axial radius of curvature of a surface located nearest to an object side of the rear subgroup of the second lens group, $R_{2RR}$ is an axial radius of curvature of a surface located nearest to an image side of the rear subgroup of the second lens group, $v_{2RN}$ is a d-line based Abbe number of a medium of the negative lens element in the rear subgroup of the second lens group, and $v_{22}$ is a d-line based Abbe number of a medium of the negative lens element in the front subgroup of the second lens group.

7. The zoom lens according to claim 1, wherein the front subgroup of the second lens group satisfies condition (11):

$$0.6 < R_{23}/R_{21} < 1.0 \quad (11)$$

where $R_{21}$ is an axial radius of curvature of a surface located nearest to an object side of the front subgroup of the second lens group, and $R_{23}$ is an axial radius of curvature of a surface located nearest to an image side of the front subgroup of the second lens group.

8. The zoom lens according to claim 1, wherein the second lens group satisfies condition (12):

$$0.05 < f_{2R}/R_{22} < 1.5 \quad (12)$$

where $R_{22}$ is an axial radius of curvature of a cementing surface in the front subgroup of the second lens group, and $f_{2R}$ is a focal length of the rear subgroup of the second lens group.

9. The zoom lens according to claim 1, wherein the rear subgroup of the second lens group satisfies condition (13):

$$0.7 < f_{2R}/f_2 < 2 \quad (13)$$

where $f_{2R}$ is a focal length of the rear subgroup of the second lens group, and $f_2$ is a composite focal length of the second lens group.

10. The zoom lens according to claim 1, wherein the front subgroup of the second lens group satisfies condition (14):

$$0.01 < n_{22} - n_{21} < 0.20 \quad (14)$$

where $n_{21}$ and $n_{22}$ are d-line based refractive indices of media of the positive and negative lens elements in the front subgroup of the second lens group, respectively.

11. The zoom lens according to claim 1, wherein upon zooming from the wide-angle end to the telephoto end of the zoom lens upon focused on an infinite object point, the third lens group moves in a convex locus toward the object or image side of the zoom lens.

12. The zoom lens according to claim 1, wherein the third lens group consists of only one positive single lens component.

13. The zoom lens according to claim 1, wherein a stop is interposed between the first lens group and the second lens group.

14. The zoom lens according to claim 13, wherein upon zooming the stop moves together with the second lens group.

15. The zoom lens according to claim 1, wherein focusing on a nearby object point is performed by movement of the third lens group.

16. The zoom lens according to claim 1, which has a half angle of view, $\omega_W$, of 27° to 42° at the wide-angle end.

17. An electronic imaging system comprising a zoom lens as recited in claim 1 and an image pickup device located on an image side of the zoom lens.

18. The electronic imaging system according to claim 17, wherein the image pickup device satisfies the following condition with respect to a diagonal length, L, of an, effective image pickup area thereof:

$$3.0 \text{ mm} < L < 12.0 \text{ mm}.$$

19. The zoom lens according to claim 1, wherein the second lens group consists of the front subgroup and the rear subgroup.

20. The electronic imaging system according to claim 17, which satisfies condition (20):

$$F \geq a \quad (20)$$

where a is a horizontal pixel pitch in mm of the electronic image pickup device, and F is a full-aperture F-number of the zoom lens at a wide-angle end thereof.

21. The electronic imaging system according to claim 20, wherein an aperture stop that determines the full-aperture F-number has a fixed inner diameter, a lens having a convex surface directed toward the aperture stop is provided, and a point of intersection of an optical axis with a perpendicular from the aperture stop down to the optical system is positioned within 0.5 mm from an interior of the lens or a surface apex of the convex surface.

22. The electronic imaging system according to claim 21, which further comprises a variable transmittance means for varying transmittance to control a quantity of light guided to the electronic image pickup device, wherein the variable transmittance means is located in an optical path through a space different from that in which the aperture stop is located.

23. The electronic imaging system according to claim 21, which further comprises a shutter for controlling a receptive time for a light beam guided to the electronic image pickup device, wherein the shutter is located in an optical path through a space different from that in which the aperture stop is located.

* * * * *

UNITED STATES PATENT AND TRADEMARK OFFICE
CERTIFICATE OF CORRECTION

PATENT NO. : 6,809,879 B2
DATED : October 26, 2004
INVENTOR(S) : Shinichi Mihara It is certified that error appears in the above-identified patent and that said Letters Patent is hereby corrected as shown below:

Title page,
Item [57], ABSTRACT, delete and replace with the following ABSTRACT:

-- A zoom lens comprises a first lens group G1 of negative refractive power, a second lens group G2 of positive refractive power and a third lens group G3 of positive refractive power. Upon zooming from the wide – angle end to the telephoto end of the zoom lens, the second lens group G2 moves toward the object side alone of the zoom lens, and the third lens group G3 moves while the spacing between the third lens group G3 and the second lens group G2 varies. The second lens group G2 is composed of a front subgroup and a rear subgroup. The front subgroup is composed of a doublet component consisting of, in order from its object side, a positive lens element having an aspheric surface and a negative lens element, and the rear subgroup is composed of one positive lens component. --

Column 18,
Line 66, change "eigth" to -- eighth --.

Signed and Sealed this

Twenty-first Day of June, 2005

JON W. DUDAS
*Director of the United States Patent and Trademark Office*